US008401928B2

(12) United States Patent
Herrmann et al.

(10) Patent No.: US 8,401,928 B2
(45) Date of Patent: Mar. 19, 2013

(54) PROVIDING SUPPLIER RELATIONSHIP MANAGEMENT SOFTWARE APPLICATION AS ENTERPRISE SERVICES

(75) Inventors: Karina Herrmann, Weinheim (DE); Andreas Brossler, Leingarten (DE); Torsten Reichardt, Malsch (DE); Markus Biehler, Landau (DE); Hueseyin Haybat, Mannheim (DE); Christoph Jungkind, Heidelberg (DE); Pascal Hochwarth, Muehlhausen (DE); Amrish Singh, Pittsburgh, PA (US); Karin Brecht-Tillinger, Edingen-Neckarhausen (DE); Zeno Rummler, Stutensee-Friedrichstal (DE); Peter Fitz, Waldsee (DE); Ralf Sievers, Walldorf (DE); Antonia Gross-Tarakji, Nussloch (DE); Brit Panzer, Mannheim (DE); Tobias Hoppe-Boeken, Wiesbaden (DE); Paola Sala, Heidelberg (DE); Andre Wagner, Sinsheim (DE); Giovanni Deledda, Rauenberg (DE); Robert Reiner, Waghaeusel-Kirrlach (DE); Benjamin Klehr, Rastatt (DE); Tilo Reinhardt, Waghausel (DE); Gregor Tielsch, Mannheim (DE); Gururaj C S, Bangalore (IN)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 12/233,520

(22) Filed: Sep. 18, 2008

(65) Prior Publication Data

US 2010/0070946 A1    Mar. 18, 2010

(51) Int. Cl.
*G06Q 30/00* (2006.01)
*G06F 9/44* (2006.01)

(52) U.S. Cl. ............ 705/26.81; 717/102; 717/104; 717/120

(58) Field of Classification Search .......... 705/7, 26, 705/26.1, 26.35, 26.81, 27; 717/102, 104, 717/120
See application file for complete search history.

(56) References Cited

U.S. PATENT DOCUMENTS

| | | | |
|---|---|---|---|
| 4,947,321 | A | 8/1990 | Spence et al. |
| 5,361,198 | A | 11/1994 | Harmon et al. |

(Continued)

FOREIGN PATENT DOCUMENTS

| | | |
|---|---|---|
| WO | 00/23874 | 4/2000 |
| WO | WO 2004/083984 | 9/2004 |

(Continued)

OTHER PUBLICATIONS

Vescovi, Marcos and Hagmann, Christian; "Rules engine for enterprise system"; Aerospace & High Technology, ANTE: Abstracts in New Technologies and Engineering; Metadex, Mechanical & Transportation Engineering Abstracts; Date Unknown; p. 1.*

(Continued)

*Primary Examiner* — Ella Colbert
(74) *Attorney, Agent, or Firm* — Fish & Richardson P.C.

(57) ABSTRACT

Methods and apparatus, including systems and computer program products, for a services architecture design that provides enterprise services having supplier relationship management functionality at the level of an enterprise application. The design includes a set of service operations, process components, and optionally deployment units. Suitable business objects are also described.

10 Claims, 25 Drawing Sheets

U.S. PATENT DOCUMENTS

| | | | |
|---|---|---|---|
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,632,022 A | 5/1997 | Warran et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 * | 5/2001 | Sadahiro ................ 717/110 |
| 6,256,773 B1 | 7/2001 | Bowman-Amuah |
| 6,272,672 B1 | 8/2001 | Conway |
| 6,289,502 B1 | 9/2001 | Garland et al. |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 * | 1/2005 | Srivastava et al. ............ 717/100 |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,950,802 B1 | 9/2005 | Barnes et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,051,071 B2 | 5/2006 | Stewart et al. |
| 7,058,587 B1 | 6/2006 | Horne |
| 7,069,536 B2 | 6/2006 | Yaung |
| 7,072,855 B1 | 7/2006 | Godlewski et al. |
| 7,076,762 B2 | 7/2006 | Fisher |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B2 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 * | 12/2006 | Cirulli et al. .................... 705/17 |
| 7,155,409 B1 | 12/2006 | Stroh |
| 7,181,694 B2 | 2/2007 | Reiss et al. |
| 7,184,964 B2 | 2/2007 | Wang |
| 7,191,740 B2 | 3/2007 | Beringer et al. |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,280,955 B2 | 10/2007 | Martin |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,401,334 B2 | 7/2008 | Fussell |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 * | 12/2008 | Jenkins et al. ............. 379/88.25 |
| 7,461,030 B2 | 12/2008 | Hibler et al. |
| 7,469,233 B2 | 12/2008 | Shooks et al. |
| 7,493,594 B2 | 2/2009 | Shenfield et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |

| | | | | | |
|---|---|---|---|---|---|
| 7,640,195 B2 | 12/2009 | Von Zimmermann et al. | 2003/0212602 A1 | 11/2003 | Schaller |
| 7,640,291 B2 | 12/2009 | Maturana et al. | 2003/0233290 A1 | 12/2003 | Yang et al. |
| 7,644,390 B2 | 1/2010 | Khodabandehloo et al. | 2004/0015367 A1 | 1/2004 | Nicastro et al. |
| 7,653,898 B1 | 1/2010 | Ali et al. | 2004/0034578 A1 | 2/2004 | Oney et al. |
| 7,657,406 B2 | 2/2010 | Tolone et al. | 2004/0054564 A1 | 3/2004 | Fonseca et al. |
| 7,657,445 B1 | 2/2010 | Goux | 2004/0093268 A1 | 5/2004 | Ramchandani et al. |
| 7,665,083 B2 | 2/2010 | Demant et al. | 2004/0093381 A1 | 5/2004 | Hodges et al. |
| 7,668,761 B2 | 2/2010 | Jenkins et al. | 2004/0111304 A1 | 6/2004 | Meka et al. |
| 7,672,888 B2 | 3/2010 | Allin et al. | 2004/0111639 A1 | 6/2004 | Schwartz et al. |
| 7,676,786 B2 | 3/2010 | Shenfield et al. | 2004/0128180 A1 | 7/2004 | Abel et al. |
| 7,681,176 B2 | 3/2010 | Wills et al. | 2004/0133481 A1 | 7/2004 | Schwarze et al. |
| 7,693,586 B2 | 4/2010 | Dumas et al. | 2004/0153359 A1 | 8/2004 | Ho et al. |
| 7,703,073 B2 | 4/2010 | Illowsky et al. | 2004/0158506 A1 | 8/2004 | Wille |
| 7,739,160 B1 | 6/2010 | Ryan et al. | 2004/0172510 A1 | 9/2004 | Nagashima et al. |
| 7,742,985 B1 | 6/2010 | Digrigoli et al. | 2004/0177342 A1 | 9/2004 | Worley, Jr. |
| 7,747,980 B2 | 6/2010 | Illowsky et al. | 2004/0181470 A1 | 9/2004 | Grounds |
| 7,765,156 B2 | 7/2010 | Staniar et al. | 2004/0181538 A1 | 9/2004 | Lo et al. |
| 7,765,521 B2 | 7/2010 | Bryant | 2004/0205011 A1 | 10/2004 | Northington et al. |
| 7,784,025 B2 | 8/2010 | Challapalli et al. | 2004/0236639 A1 | 11/2004 | Candadai et al. |
| 7,788,145 B2 | 8/2010 | Wadawadigi et al. | 2004/0236687 A1 | 11/2004 | Tyson-Quah |
| 7,788,319 B2 | 8/2010 | Schmidt | 2004/0243489 A1 | 12/2004 | Mitchell et al. |
| 7,793,256 B2 | 9/2010 | Charisius et al. | 2004/0254866 A1 | 12/2004 | Crumbach et al. |
| 7,793,258 B2 | 9/2010 | Sundararajan et al. | 2004/0255152 A1 | 12/2004 | Kanamori et al. |
| 7,797,698 B2 | 9/2010 | Diament et al. | 2005/0010501 A1 | 1/2005 | Ward, Jr. |
| 7,805,365 B1 | 9/2010 | Slavin et al. | 2005/0022160 A1 | 1/2005 | Uluakar et al. |
| 7,814,142 B2 | 10/2010 | Mamou et al. | 2005/0033588 A1 | 2/2005 | Ruiz et al. |
| 7,822,682 B2 | 10/2010 | Arnold et al. | 2005/0044015 A1 | 2/2005 | Bracken et al. |
| 7,835,971 B2 | 11/2010 | Stockton et al. | 2005/0060235 A2 | 3/2005 | Byrne |
| 7,886,041 B2 | 2/2011 | Outhred et al. | 2005/0060408 A1 | 3/2005 | McIntyre et al. |
| 7,895,568 B1 | 2/2011 | Goodwin et al. | 2005/0065828 A1 | 3/2005 | Kroswek et al. |
| 7,904,350 B2 | 3/2011 | Ayala et al. | 2005/0108680 A1 | 5/2005 | Cheng et al. |
| 7,912,755 B2 | 3/2011 | Perry et al. | 2005/0113092 A1 | 5/2005 | Coppinger et al. |
| 7,917,889 B2 | 3/2011 | Devarakonda et al. | 2005/0114829 A1 | 5/2005 | Robin et al. |
| 7,925,985 B2 | 4/2011 | Moore | 2005/0125310 A1 | 6/2005 | Hazi et al. |
| 8,001,519 B2 * | 8/2011 | Conallen et al. ............... 717/105 | 2005/0144125 A1 | 6/2005 | Erbey et al. |
| 8,006,224 B2 | 8/2011 | Bateman et al. | 2005/0144226 A1 | 6/2005 | Purewal |
| 8,010,938 B2 | 8/2011 | Elaasar | 2005/0156500 A1 | 7/2005 | Birecki et al. |
| 8,051,332 B2 | 11/2011 | Zakonov et al. | 2005/0160104 A1 | 7/2005 | Meera et al. |
| 8,078,485 B1 | 12/2011 | Kraehmueller et al. | 2005/0165784 A1 | 7/2005 | Gomez et al. |
| 8,086,995 B2 | 12/2011 | Luo et al. | 2005/0177435 A1 | 8/2005 | Lidow |
| 8,091,065 B2 | 1/2012 | Mir et al. | 2005/0203760 A1 | 9/2005 | Gottumukkala et al. |
| 8,112,738 B2 | 2/2012 | Pohl et al. | 2005/0203813 A1 | 9/2005 | Welter et al. |
| 8,140,455 B2 | 3/2012 | Hutson et al. | 2005/0209732 A1 | 9/2005 | Audimoolam et al. |
| 2001/0052108 A1 | 12/2001 | Bowman-Amuah | 2005/0209943 A1 | 9/2005 | Ballow et al. |
| 2002/0026394 A1 | 2/2002 | Savage et al. | 2005/0216325 A1 | 9/2005 | Ziad et al. |
| 2002/0042756 A1 | 4/2002 | Kumar et al. | 2005/0216507 A1 | 9/2005 | Wright |
| 2002/0049622 A1 | 4/2002 | Lettich et al. | 2005/0222896 A1 | 10/2005 | Rhyne et al. |
| 2002/0069144 A1 | 6/2002 | Palardy | 2005/0234787 A1 | 10/2005 | Wallmeier et al. |
| 2002/0073114 A1 | 6/2002 | Nicastro et al. | 2005/0235020 A1 | 10/2005 | Gabelmann et al. |
| 2002/0073396 A1 | 6/2002 | Crupi et al. | 2005/0240592 A1 | 10/2005 | Mamou et al. |
| 2002/0078046 A1 | 6/2002 | Uluakar et al. | 2005/0246250 A1 | 11/2005 | Murray |
| 2002/0082892 A1 | 6/2002 | Raffel et al. | 2005/0246482 A1 | 11/2005 | Gabelmann et al. |
| 2002/0095650 A1 | 7/2002 | Green et al. | 2005/0256775 A1 | 11/2005 | Schapler et al. |
| 2002/0100014 A1 | 7/2002 | Iborra et al. | 2005/0256882 A1 | 11/2005 | Able et al. |
| 2002/0103660 A1 | 8/2002 | Cramon et al. | 2005/0257125 A1 | 11/2005 | Roesner et al. |
| 2002/0104071 A1 | 8/2002 | Charisius et al. | 2005/0257197 A1 | 11/2005 | Herter et al. |
| 2002/0107826 A1 | 8/2002 | Ramachandran et al. | 2005/0262192 A1 | 11/2005 | Mamou et al. |
| 2002/0120553 A1 | 8/2002 | Bowman-Amuah | 2005/0262453 A1 | 11/2005 | Massasso |
| 2002/0133368 A1 | 9/2002 | Strutt et al. | 2005/0284934 A1 | 12/2005 | Ernesti et al. |
| 2002/0138281 A1 | 9/2002 | Cirulli et al. | 2005/0288987 A1 | 12/2005 | Sattler et al. |
| 2002/0138358 A1 | 9/2002 | Scheer | 2005/0289020 A1 | 12/2005 | Bruns et al. |
| 2002/0143598 A1 | 10/2002 | Scheer | 2005/0289079 A1 | 12/2005 | Krishan et al. |
| 2002/0156695 A1 | 10/2002 | Edwards | 2006/0004802 A1 | 1/2006 | Phillips et al. |
| 2002/0161907 A1 | 10/2002 | Moon | 2006/0053063 A1 | 3/2006 | Nagar |
| 2002/0165745 A1 | 11/2002 | Greene et al. | 2006/0064344 A1 | 3/2006 | Lidow |
| 2002/0184111 A1 | 12/2002 | Swanson | 2006/0074704 A1 | 4/2006 | Shukla et al. |
| 2002/0188486 A1 | 12/2002 | Gil et al. | 2006/0074731 A1 | 4/2006 | Green et al. |
| 2002/0198798 A1 | 12/2002 | Ludwig et al. | 2006/0080338 A1 | 4/2006 | Seubert et al. |
| 2002/0198828 A1 | 12/2002 | Ludwig et al. | 2006/0085243 A1 | 4/2006 | Cooper et al. |
| 2003/0009754 A1 | 1/2003 | Rowley et al. | 2006/0085294 A1 | 4/2006 | Boerner et al. |
| 2003/0058277 A1 | 3/2003 | Bowman-Amuah | 2006/0085336 A1 | 4/2006 | Seubert et al. |
| 2003/0069774 A1 | 4/2003 | Hoffman et al. | 2006/0089886 A1 | 4/2006 | Wong |
| 2003/0074271 A1 | 4/2003 | Viswanath et al. | 2006/0095439 A1 | 5/2006 | Buchmann et al. |
| 2003/0074360 A1 | 4/2003 | Chen et al. | 2006/0129978 A1 | 6/2006 | Abrari et al. |
| 2003/0083762 A1 | 5/2003 | Farrah et al. | 2006/0143029 A1 | 6/2006 | Akbay et al. |
| 2003/0084127 A1 | 5/2003 | Budhiraja et al. | 2006/0149574 A1 | 7/2006 | Bradley et al. |
| 2003/0101112 A1 | 5/2003 | Gallagher et al. | 2006/0206352 A1 | 9/2006 | Pulianda |
| 2003/0130860 A1 | 7/2003 | Datta et al. | 2006/0248504 A1 | 11/2006 | Hughes |
| 2003/0182206 A1 | 9/2003 | Hendrix et al. | 2006/0274720 A1 | 12/2006 | Adams et al. |

| | | | |
|---|---|---|---|
| 2006/0287939 A1 | 12/2006 | Harel et al. | |
| 2006/0288350 A1 | 12/2006 | Grigorovitch et al. | |
| 2007/0011650 A1 | 1/2007 | Hage et al. | |
| 2007/0022410 A1 | 1/2007 | Ban et al. | |
| 2007/0050308 A1 | 3/2007 | Latvala et al. | |
| 2007/0074150 A1 | 3/2007 | Jolfaei et al. | |
| 2007/0075916 A1 | 4/2007 | Bump et al. | |
| 2007/0094098 A1 | 4/2007 | Mayer et al. | |
| 2007/0094261 A1 | 4/2007 | Phelan et al. | |
| 2007/0129964 A1 | 6/2007 | Helmolt et al. | |
| 2007/0129984 A1 | 6/2007 | von Helmolt et al. | |
| 2007/0129985 A1 | 6/2007 | Helmolt et al. | |
| 2007/0143164 A1 | 6/2007 | Kaila et al. | |
| 2007/0150332 A1 | 6/2007 | Grichnik et al. | |
| 2007/0150387 A1 | 6/2007 | Seubert et al. | |
| 2007/0150855 A1 | 6/2007 | Jeong | |
| 2007/0156428 A1 | 7/2007 | Brecht-Tillinger et al. | |
| 2007/0156430 A1 | 7/2007 | Kaetker et al. | |
| 2007/0156474 A1* | 7/2007 | Scherberger et al. | 705/7 |
| 2007/0156475 A1 | 7/2007 | Berger et al. | |
| 2007/0156476 A1 | 7/2007 | Koegler et al. | |
| 2007/0156482 A1 | 7/2007 | Bagheri | |
| 2007/0156489 A1 | 7/2007 | Berger et al. | |
| 2007/0156493 A1* | 7/2007 | Tebbe et al. | 705/8 |
| 2007/0156499 A1 | 7/2007 | Berger et al. | |
| 2007/0156500 A1 | 7/2007 | Merkel et al. | |
| 2007/0156538 A1* | 7/2007 | Peter et al. | 705/26 |
| 2007/0156550 A1 | 7/2007 | Der Emde et al. | |
| 2007/0156731 A1 | 7/2007 | Ben-Zeev | |
| 2007/0162893 A1 | 7/2007 | Kaetker et al. | |
| 2007/0164849 A1 | 7/2007 | Haeberle et al. | |
| 2007/0168303 A1 | 7/2007 | Kaetker et al. | |
| 2007/0174068 A1 | 7/2007 | Alfandary et al. | |
| 2007/0174145 A1 | 7/2007 | Hetzer et al. | |
| 2007/0174811 A1* | 7/2007 | Kaetker et al. | 717/104 |
| 2007/0186209 A1 | 8/2007 | Kaetker et al. | |
| 2007/0197877 A1 | 8/2007 | Decorte et al. | |
| 2007/0198391 A1 | 8/2007 | Dreyer et al. | |
| 2007/0214065 A1 | 9/2007 | Kahlon et al. | |
| 2007/0220046 A1 | 9/2007 | Kaetker et al. | |
| 2007/0220143 A1* | 9/2007 | Lund et al. | 709/224 |
| 2007/0233539 A1 | 10/2007 | Suenderhauf et al. | |
| 2007/0233541 A1 | 10/2007 | Schorr et al. | |
| 2007/0233545 A1 | 10/2007 | Cala et al. | |
| 2007/0233574 A1 | 10/2007 | Koegler et al. | |
| 2007/0233575 A1 | 10/2007 | Berger et al. | |
| 2007/0233581 A1 | 10/2007 | Peter | |
| 2007/0233598 A1 | 10/2007 | Der Emde et al. | |
| 2007/0234282 A1 | 10/2007 | Prigge et al. | |
| 2007/0239508 A1 | 10/2007 | Fazal et al. | |
| 2007/0239569 A1 | 10/2007 | Lucas et al. | |
| 2007/0265860 A1 | 11/2007 | Herrmann et al. | |
| 2007/0265862 A1* | 11/2007 | Freund et al. | 705/1 |
| 2008/0004929 A9 | 1/2008 | Raffel et al. | |
| 2008/0010049 A1 | 1/2008 | Pouchak et al. | |
| 2008/0017722 A1 | 1/2008 | Snyder et al. | |
| 2008/0027831 A1 | 1/2008 | Gerhardt | |
| 2008/0065437 A1 | 3/2008 | Dybvig | |
| 2008/0120129 A1 | 5/2008 | Seubert et al. | |
| 2008/0147507 A1 | 6/2008 | Langhammer | |
| 2008/0162382 A1 | 7/2008 | Clayton et al. | |
| 2008/0208707 A1 | 8/2008 | Erbey et al. | |
| 2008/0215354 A1 | 9/2008 | Halverson et al. | |
| 2008/0263152 A1 | 10/2008 | Daniels et al. | |
| 2008/0300959 A1 | 12/2008 | Sinha et al. | |
| 2009/0037287 A1 | 2/2009 | Baitalmal et al. | |
| 2009/0037492 A1 | 2/2009 | Baitalmal et al. | |
| 2009/0063112 A1* | 3/2009 | Hader et al. | 703/6 |
| 2009/0171716 A1 | 7/2009 | Suenderhauf et al. | |
| 2009/0171818 A1 | 7/2009 | Penning et al. | |
| 2009/0172699 A1 | 7/2009 | Jungkind et al. | |
| 2009/0189743 A1 | 7/2009 | Abraham et al. | |
| 2009/0192858 A1 | 7/2009 | Johnson | |
| 2010/0070324 A1 | 3/2010 | Bock et al. | |
| 2010/0070331 A1 | 3/2010 | Koegler et al. | |
| 2010/0070336 A1 | 3/2010 | Koegler et al. | |
| 2010/0070391 A1 | 3/2010 | Storr et al. | |
| 2010/0070395 A1 | 3/2010 | Elkeles et al. | |
| 2010/0070555 A1 | 3/2010 | Duparc et al. | |
| 2010/0100464 A1 | 4/2010 | Ellis et al. | |
| 2010/0138269 A1 | 6/2010 | Cirpus et al. | |
| 2011/0252395 A1 | 10/2011 | Charisius et al. | |

FOREIGN PATENT DOCUMENTS

WO    WO 2005/114381    12/2005

OTHER PUBLICATIONS

Schaub, Thomas M., Schaefer, Andreas, and Schnoerer, Host; "Enterprise management application providing availability control checks on revenue budgets"; Aerospace & High Technology, ANTE: Abstracts in New Technologies and Engineering; Metdex, Mechanical & Transportation Engineering Abstracts; Date Unknown; p. 1.*
Anonymous; "Mastering Management"; Motor Age, v125, n10; Oct. 2006; pp. 1-3.*
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions,/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

"American Software Announces ASP Pricing Model for It's a-Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; " Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218.

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Office Action issued in U.S. Appl. No. 11/322,772; Jul. 12, 2010; 18 pages.

Office Action issued in U.S. Appl. No. 11/322,398 on Apr. 2, 2010; 39 pages.

Notice of Allowance issued in U.S. Appl. No. 11/322,398 on Jul. 23, 2010; 38 pages.

Office Action issued in U.S. Appl. No. 11/322,383; May 12, 2010; 23 pages.

Office Action issued in U.S. Appl. No. 11/322,382 on Mar. 29, 2010; 28 pages.

Office Action issued in U.S. Appl. No. 11/323,041 on Mar. 19, 2010; 26 pages.

Advisory Action issued in U.S. Appl. No. 11/323,041 on Jun. 7, 2010; 3 pages.

Notice of Allowance issued in U.S. Appl. No. 11/396,259 on Mar. 29, 2010; 19 pages.

Notice of Allowance issued in U.S. Appl. No. 11/396,288; May 20, 2010; 15 pages.

Notice of Allowance issued in U.S. Appl. No. 11/396,258 on Mar. 31, 2010; 9 pages.

Supplemental Notice of Allowance issued in U.S. Appl. No. 11/396,258 on May 19, 2010; 8 pages.

Office Action issued in U.S. Appl. No. 11/396,236 on Mar. 31, 2010; 20 pages.

Office Action issued in U.S. Appl. No. 11/323,039; Apr. 14, 2010; 15 pages.

Office Action issued in U.S. Appl. No. 11/322,851; May 12, 2010; 15 pages.

Office Action issued in U.S. Appl. No. 11/322,845; Jul. 15, 2010; 16 pages.

Office Action issued in U.S. Appl. No. 11/323,040; Apr. 29, 2010; 17 pages.

Office Action issued in U.S. Appl. No. 11/322,612; Apr. 1, 2010; 23 pages.

Advisory Action issued in U.S. Appl. No. 11/322,612; Jun. 24, 2010; 3 pages.

Notice of Allowance issued in U.S. Appl. No. 11/397,026 on Mar. 29, 2010; 17 pages.

Supplemental Notice of Allowance issued in U.S. Appl. No. 11/397,026 on Jul. 9, 2010; 4 pages.

Notice of Allowance issued in U.S. Appl. No. 11/397,026 on Jul. 26, 2010; 6 pages.

Notice of Allowance issued in U.S. Appl. No. 12/233,554 on May 14, 2010; 11 pages.

Notice of Allowance issued in U.S. Appl. No. 12/233,534 on Jun. 24, 2010; 15 pages.

Notice of Allowance issued in U.S. Appl. No. 12/327,354 on Jun. 25, 2010; 16 pages.

Notice of Allowance issued in U.S. Appl. No. 11/967,865 on Mar. 31, 2010; 16 pages.

Notice of Allowance issued in U.S. Appl. No. 11/322,482; Jul. 13, 2010; 5 pages.

Office Action issued in U.S. Appl. No. 11/323,590; Jun. 21, 2010; 25 pages.

Office Action issued in U.S. Appl. No. 11/323,634; Apr. 2, 2010; 9 pages.

Office Action issued in U.S. Appl. No. 11/322,816; Apr. 15, 2010; 27 pages.

Office Action issued in U.S. Appl. No. 11/396,327 on Apr. 1, 2010; 26 pages.

Office Action issued in U.S. Appl. No. 12/333,085; Mar. 23, 2010; 5 pages.

Bin et al.; "Component Model Optimization for Distributed Real-Time Embedded Software"; IEEE International Conference on Systems, Man and Cybernetics; Oct. 13, 2004; 6 pages.

Cascallar, Eduardo et al.; "Assessment in the Evaluation of Self-Regulation as a Process"; Educational Psychology Review; vol. 18, No. 3; Sep. 2006; pp. 297-306.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.

Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Office Action issued in U.S. Appl. No. 11/322,816; Jul. 23, 2009; 41 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/233,534 on Dec. 28, 2011; 7 pages.
Notice of Allowanced issued in U.S. Appl. No. 11/322,398 on Oct. 18, 2011; 7 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Jul. 6, 2010; 6 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
Business Editors/Technology Writers; "CrossWorlds Software Announces J2EE Interoperability with Open Standards Interface"; Business Wire, 1; Nov. 20; Retrieved on Jun. 12, 2012.
"IDe Partners with Journyx to Offer Customers Best-in-Class Time Management Solution"; PR Newswire; Mar. 8, 2005; Business Dateline.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach"; International Journal of Software Engineering and Knowledge Engineering; vol. 9, No. 3; 1999; pp. 297-317.
"SAP NetWeaver Empowers IT to Drive Innovation into Business Processes across the Enterprise"; Canada NewsWire, 1; May 13; Retrieved on Jun. 12, 2012.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.
Notice of Allowance in U.S. Appl. No. 12/233,462 on Apr. 5, 2012; 7 pages.
Notice of Allowance issued in U.S. Appl. No. 11/322,382 on May 21, 2012; 5 pages.
Notice of Allowance issued in U.S. Appl. No. 11/322,816 on Aug. 29, 2012; 18 pages.
Notice of Allowance issued in U.S. Appl. No. 11/322,851 on Mar. 1, 2012; 9 pages.
Notice of Allowance issued in U.S. Appl. No. 11/323,040 on Jun. 8, 2012; 9 pages.

Notice of Allowance issued in U.S. Appl. No. 11/323,634 on Jan. 25, 2012; 5 pages.
Notice of Allowance issued in U.S. Appl. No. 11/396,250 on Jul. 10, 2012; 6 pages.
Notice of Allowance issued in U.S. Appl. No. 11/396,258 on Feb. 3, 2012; 12 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 psges.
Notice of Allowance issued in U.S. Appl. No. 11/396,327 on Jun. 20, 2012; 29 pages.
Notice of Allowance issued in U.S. Appl. No. 11/397,026 on Feb. 23, 2012; 8 pages.
Notice of Allowance issued in U.S. Appl. No. 11/404,147 on Jul. 5, 2012; 5 pages.
Notice of Allowance issued in U.S. Appl. No. 12/233,075 on Mar. 22, 2012; 25 pages.
Notice of Allowance issued in U.S. Appl. No. 12/233,087 on Mar. 30, 2012; 30 pages.
Notice of Allowance issued in U.S. Appl. No. 12/233,289 on Feb. 15, 2012; 11 pages.
Notice of Allowance issued in U.S. Appl. No. 12/233,417 on Jul. 27, 2012; 10 pages.
Notice of Allowance issued in U.S. Appl. No. 12/233,457 on May 16, 2012; 7 pages.
Notice of Allowance issued in U.S. Appl. No. 12/233,458 on May 1, 2012; 17 pages.
Notice of Allowance issued in U.S. Appl. No. 12/233,534 won Jul. 18, 2012;16 pages.
Notice of Allowance issued in U.S. Appl. No. 12/233,550 on Jan. 9, 2012; 11 pages.
Notice of Allowance issued in U.S. Appl. No. 12/233,554 on Aug. 3, 2012; 8 pages.
Notice of Allowance issued in U.S. Appl. No. 12/327,232 on Jun. 6, 2012; 7 pages.
Notice of Allowance issued in U.S. Appl. No. 12/327,354 on Jul. 25, 2012; 17 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowance isued in U.S. Appl. No. 11/323,039 on Jun. 7, 2012; 9 pages.
Notice of Allowanced issued in U.S. Appl. No. 11/322,398 on May 3, 2012; 7 pages.
Notice of Allowaqnce issued in U.S. Appl. No. 11/322,383 on May 21, 2012; 14 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/967,387 on Apr. 12, 2012; 13 pages.
Office Action issued in U.S. Appl. No. 11/967,489 on Feb. 6, 2012; 9 pages.
Office Action issued in U.S. Appl. No. 12/233,479 on May 7, 2012; 26 pages.
Office Action issued in U.S. Appl. No. 12/233,489 on Jun. 6, 2012; 87 pages.
Office Action issued in U.S. Appl. No. 12/327,737 on Mar. 26, 2012; 14 pages.
Office Action issued in U.S. Appl. No. 12/333,146 on Feb. 2, 2012; 21 pages.
Office Action issued in U.S. Appl. No. 13/413,069 on Aug. 1, 2012; 45 pages.
Office Action issued in U.S. Appl. No. 13/413,069 on Aug. 1, 2012; 18 pages.
Supplemental Notice of Allowance issued in U.S. Appl. No. 12/333,085; Jun. 13, 2012; 5 pages.

* cited by examiner

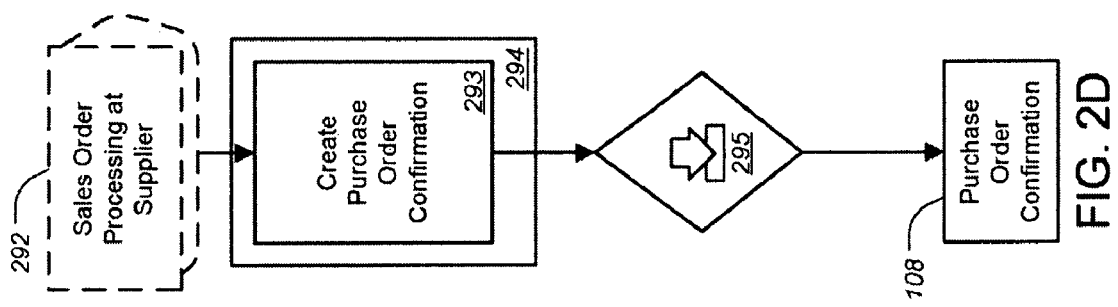

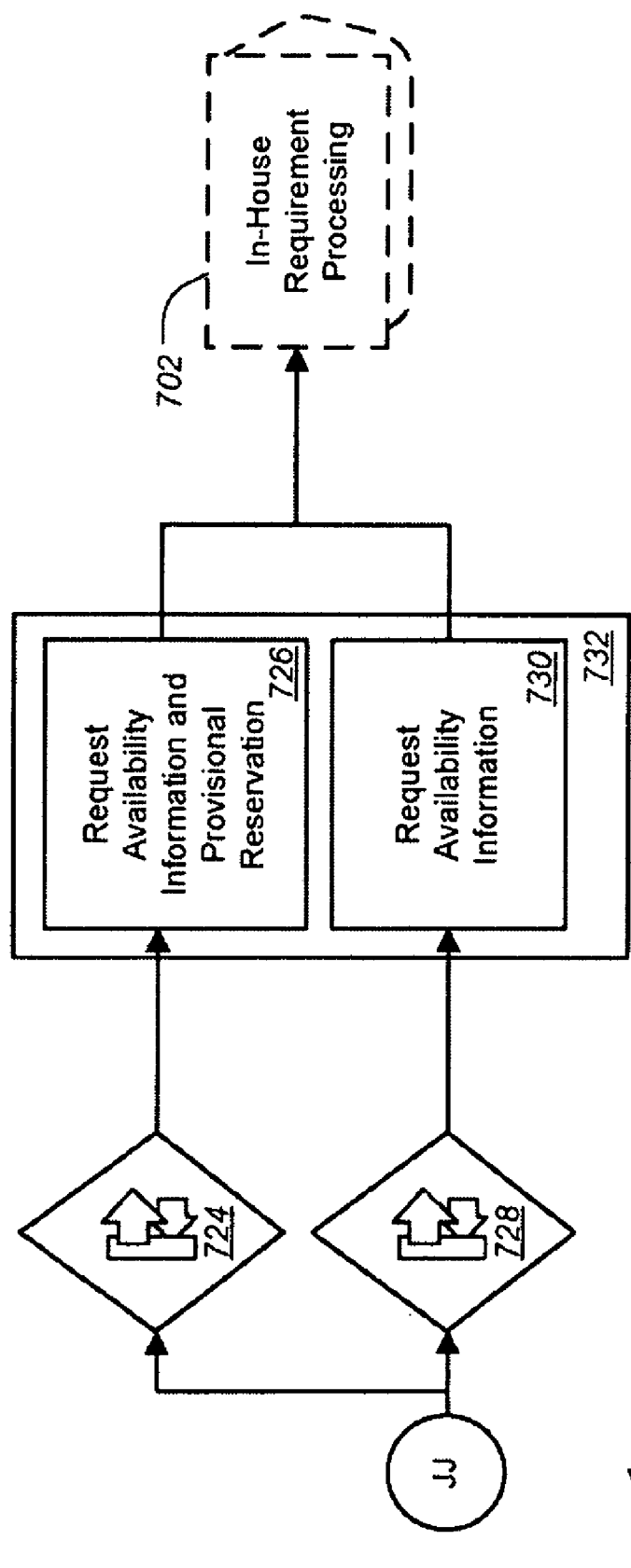

US 8,401,928 B2

PROVIDING SUPPLIER RELATIONSHIP MANAGEMENT SOFTWARE APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having supplier relationship management functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having supplier relationship management functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIGS. 2A, 2B, 2C, and 2D are block diagrams collectively showing a Purchase Order Processing process component.

FIGS. 7A, 7B, and 7C are block diagrams collectively showing an Internal Request Processing process component.

Like reference numbers and designations in the various drawings indicate like elements.

DETAILED DESCRIPTION

Figure 1A:
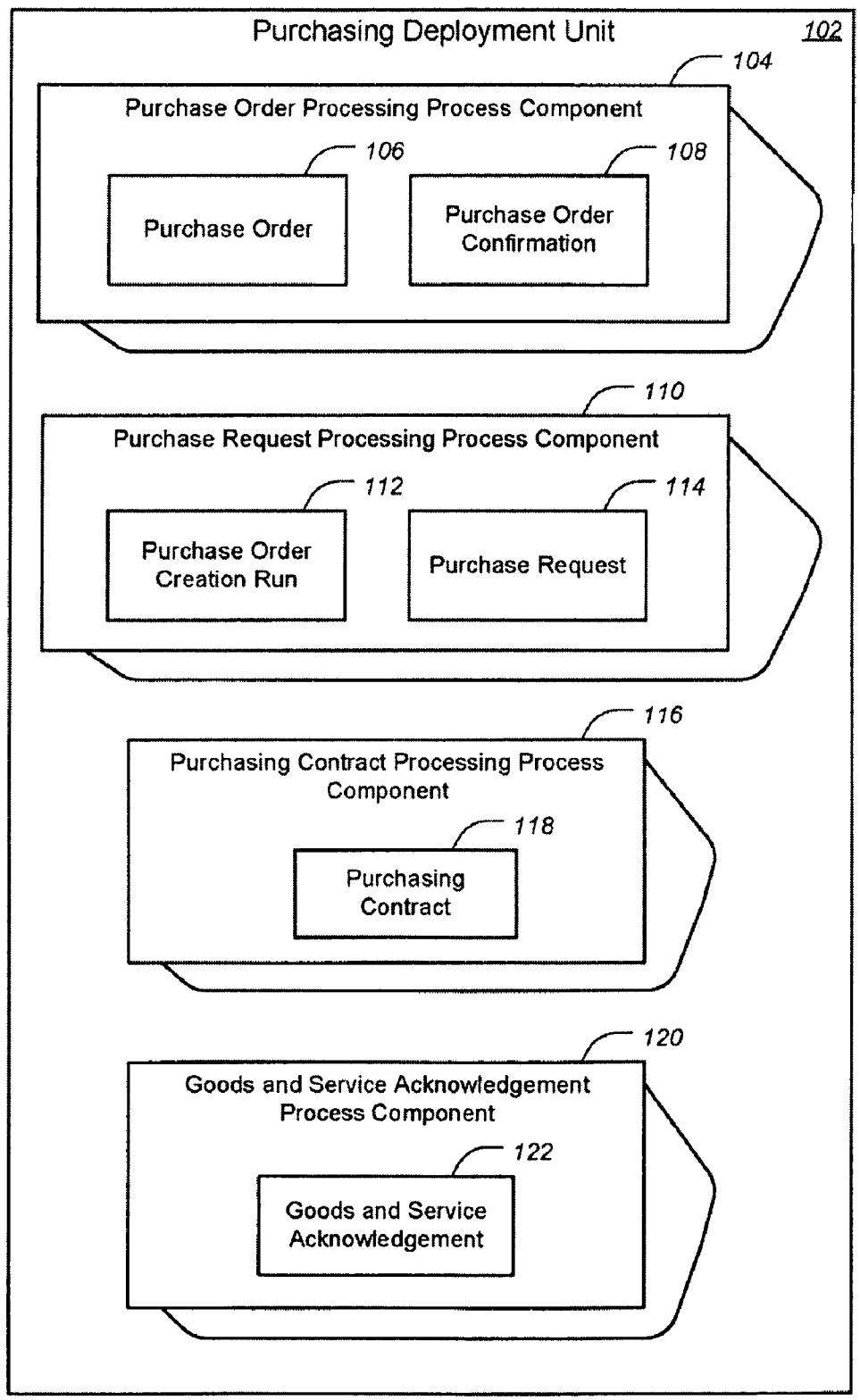
FIGS. 1A and 1B collectively illustrate a high-level view of a software architectural design and implementation of a suite of enterprise software services having supplier relationship management functionality.
Figure 1B:
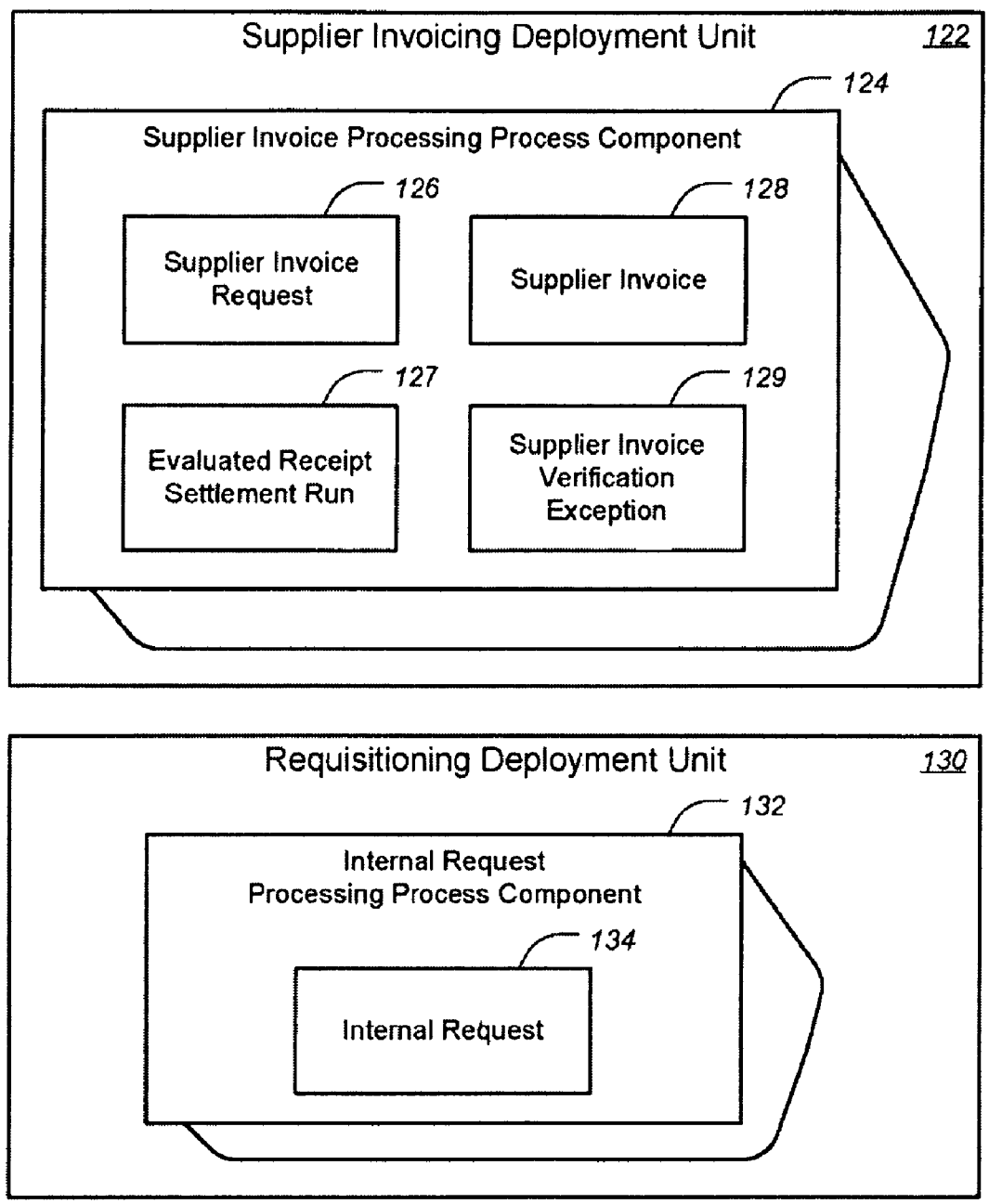

FIGS. 1A and 1B collectively illustrate a high-level view of a software architectural design, and of application software implementations of the design, that provides a suite of enterprise service operations, which can be organized into interfaces, having supplier relationship management application functionality.

The elements of the architecture include the business object, the process component, the service operation (or simply, the operation), the service interface, the message, and the deployment unit. The elements can also include process agents and reuse service components. These will be generally described below.

In some implementations, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

Business objects are further categorized as business process objects and, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object embodies or contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency. The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include optionally the service interface, which may be referred to simply as an interface. An interface is a named group of operations. Each operation belongs to exactly one interface. An interface belongs to exactly one process component. A process component might implement multiple interfaces. In some implementations, an interface will have only inbound or outbound operations, but not a mixture of both. One interface can include both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An outbound process agent will generally perform some processing of the data of the business object instance whose change triggered the agent or caused the agent to be called. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A and 1B collectively illustrate a high-level view of a software architectural design and implementation of a suite of enterprise software services having supplier relationship management functionality.

As shown in FIG. 1A, a Purchasing deployment unit 102 includes a Purchase Order Processing process component 104, a Purchase Request Processing process component 110, a Purchasing Contract Processing process component 114, and a Goods and Service Acknowledgement process component 118.

The Purchase Order Processing process component 104 handles the creation and maintenance of purchase orders and purchase order confirmations. The Purchase Order Processing process component 104 includes a Purchase Order business object 106 and a Purchase Order Confirmation business object 108.

The Purchase Request Processing process component 110 handles the creation, changing, and processing of purchase requests to locate appropriate external sources of supply. The Purchase Request Processing process component 110 includes a Purchase Order Creation Run business object 111 and a Purchase Request business object 112.

The Purchasing Contract Processing process component 114 handles the creation and maintenance of purchasing contracts. The Purchasing Contract Processing process component 114 includes a Purchasing Contract business object 116.

The Goods and Service Acknowledgement process component 118 handles a confirmation by an employee of goods received or services rendered. The Goods and Service Acknowledgement process component 118 includes a Goods and Service Acknowledgement business object 120.

As shown in FIG. 1B, a Supplier Invoicing deployment unit 122 includes a Supplier Invoice Processing process component 124 that handles the management and volume processing of supplier invoices, including exception handling and approval. The Supplier Invoice Processing process component 124 includes a Supplier Invoice Request business object 126, an Evaluated Receipt Settlement Run business object 127, a Supplier Invoice business object 128, and a Supplier Invoice Verification Exception business object 129.

As shown in FIG. 1B, a Requisitioning deployment unit 138 includes an Internal Request Processing process component 140 that handles the management and processing of internal requests from employees. The Internal Request Processing process component 140 includes an Internal Request business object 142.

FIGS. 2A, 2B, 2C, and 2D are block diagrams collectively showing the Purchase Order Processing process component 104 (FIG. 1A). For convenience in describing this process component, a number of other process components are shown in the figures; these other process components are not part of the process component being described. These other process components include the RFQ Processing process component 202 and 204, an External Procurement Trigger and Response process component 206, the Supplier Invoice Processing process component 124, a Inbound Delivery Processing 210, a Sales Order Processing at Supplier process component 270, an External Procurement Trigger and Response process component 277, a Project Processing process component 278, an Internal Request Processing process component 132, an Accounting process component 283, a Time and Labor Management process component 287, and a Sales Order Processing at Supplier process component 292. These other process components are used to represent software external to the process component in describing its interactions with the external software; however, while the external software can be implemented as such process components, this is not required.

The RFQ Processing process component 202 can send a message to the Purchase Order Processing process component 104. The message can be received in a Create Purchase Order based on Winning Quote operation 212. The operation 212 creates a purchase order from an accepted supplier quote. The operation 212 is included in a Quote Award Notification In interface 214. The Create Purchase Order based on Winning Quote operation 212 uses an asynchronous inbound process agent 216 to update the Purchase Order business object 106. The Purchase Order business object 106 represents a request from a request from a buyer to a seller to deliver a specified quantity of material, or perform a specified service, at a specified price within a specified time.

The RFQ Processing process component 204 can send a message to the Purchase Order Processing process component 104. The can be received in a Create Purchase Order based on Winning Quote operation 218. The operation 218 can create a purchase order based on the data contained in a winning supplier quote. If the supplier quote refers to a purchase request, data from the purchase request items can be added by the operation to complete the purchase order. The notification can be sent using an asynchronous inbound process agent 222 to update the Purchase Order business object 106. The Create Purchase Order based on Winning Quote operation 218 is included in a Quote Award Notification interface 220.

An External Procurement Trigger and Response process component 206 can send a message to the Purchase Order processing component 104. The message can be received in a Change Purchase Order based on Delivery Values operation 224. The operation 224 can change a purchase order based on a delivery value by adding the quantity of a confirmed inbound delivery to the cumulated delivered quantity in node Item Actual Values of a purchase order. The operation can also add the reference to the confirmed inbound delivery document to the purchase order. The notification can be sent using an asynchronous inbound process agent 228 to update the Purchase Order business object 106. The Change Purchase Order based on Delivery Values operation 224 is included in a Fulfillment In interface 226.

A Supplier Invoice Processing process component 124 can send a message to the Purchase Order processing component 104. The message can be received in a Change Purchase Order based on Invoiced Values operation 230. The operation 230 can change purchase order based on invoice values by adding the quantity and amount of a supplier invoice to the cumulated invoiced quantity and amount in node Item Actual Values of a purchase order. The operation also adds the reference to the supplier invoice document to the purchase order. The notification can be sent using an asynchronous inbound process agent 234 to update the Purchase Order business object 106. The operation 230 is included in Invoice Verification In interface 238.

An Inbound Delivery Processing third party process component 210 can send a message to the Purchase Order processing component 104. The message can be received in a Change Purchase Order based on Inbound Delivery Request 236. The operation 236 can create a purchase order based on migrated data. The notification can be sent using an asynchronous inbound process agent 240 to update the Purchase Order business object 106. The operation 236 is included in Purchase Order Inbound Delivery In 238.

The Sales Order Processing at Supplier process component 210 is drawn with dashed lines to indicate that it is used to represent an external system in describing interactions with the external system; this should be understood to require no more of the external system than that it be able to produce and receive messages as required by the process component that interacts with the external system.

Figure 2A:
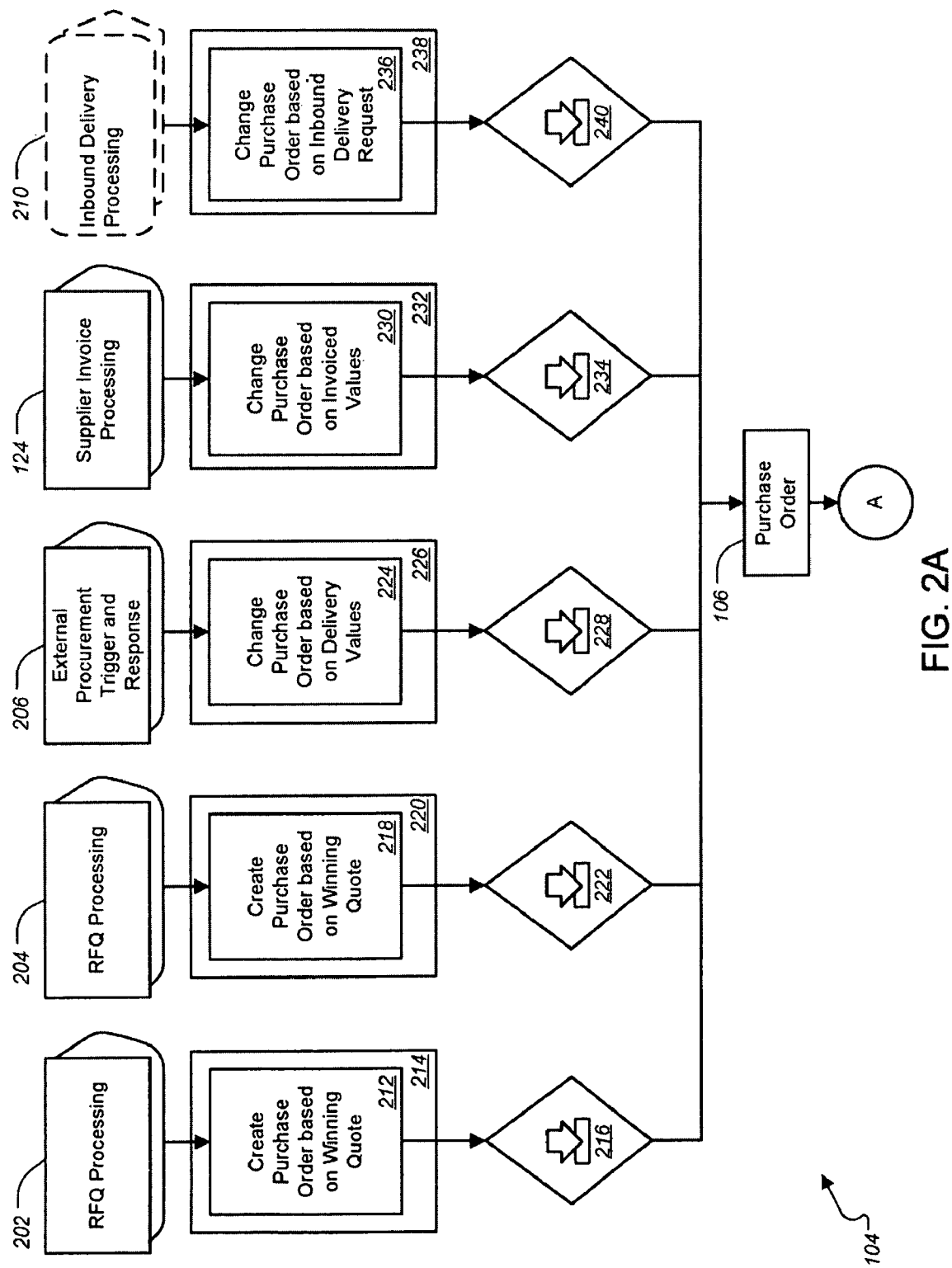
Figure 2B:
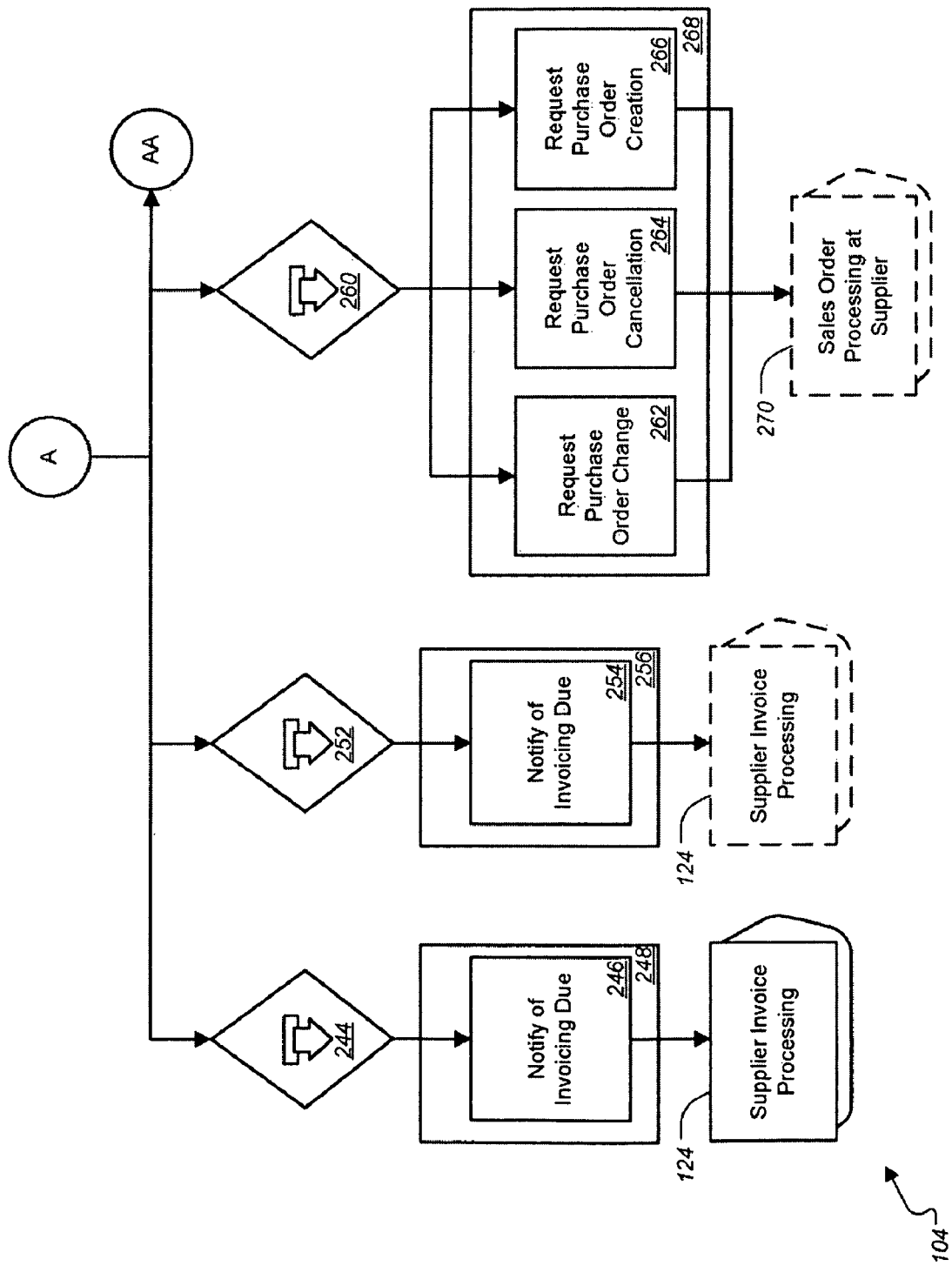
Figure 2C:
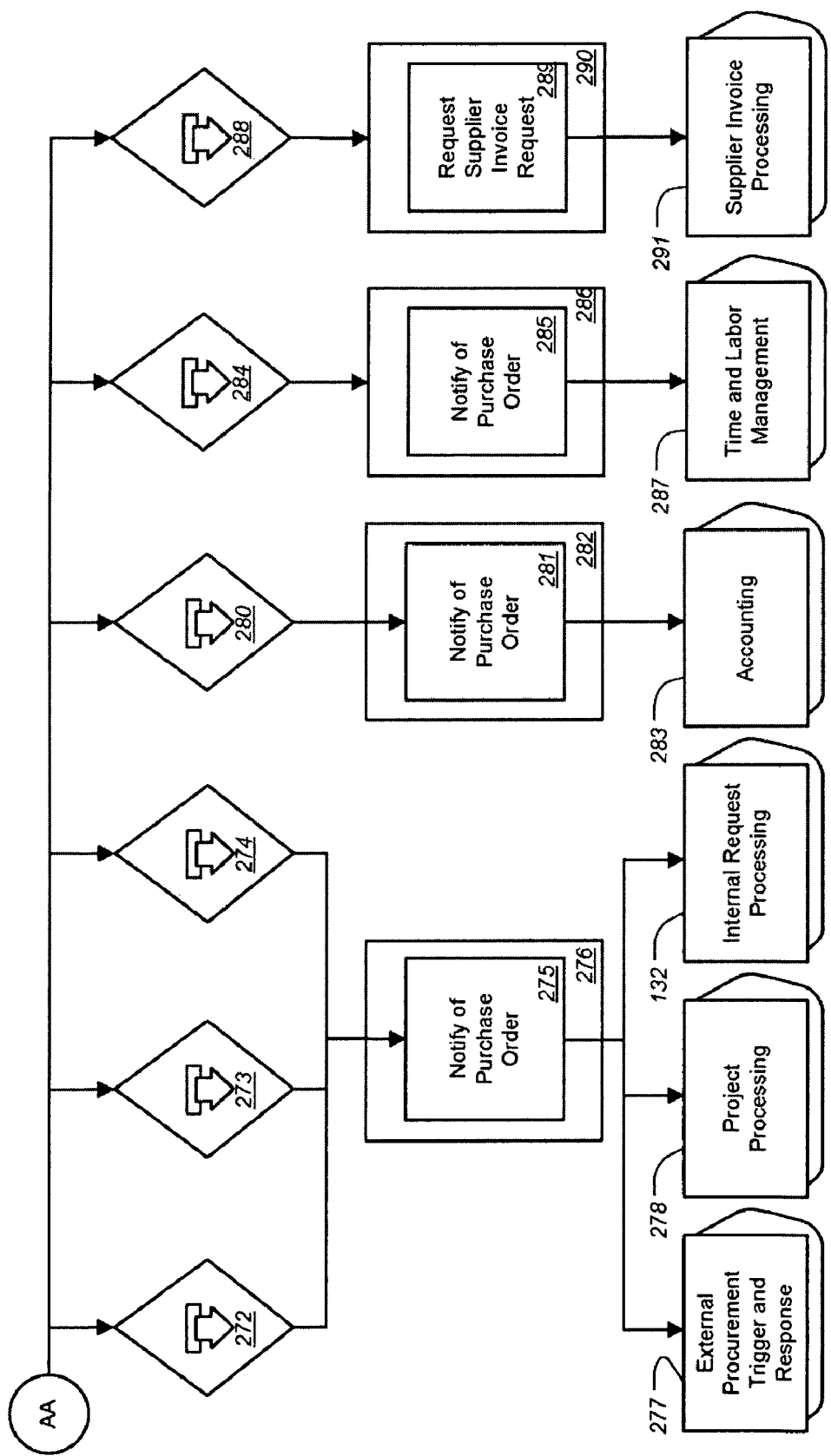

The Purchase Order business object 106 can receive updated information and can send the updated information into other components to perform further operations. The Purchase Order business object 106 is a request from a purchaser to an external supplier to deliver a specified quantity of goods, or services at a specified price within a specified time period. As shown in FIGS. 2B-2D, multiple asynchronous outbound process agents can receive information from the Purchase Order business object 106.

An asynchronous outbound process agent 244 can invoke a Notify of Invoicing Due operation 246. The operation 246 notifies the Supplier Invoice Processing process component 124 about an invoice due, and when a Purchase Order has been created, changed or cancelled. The Notify of Invoicing Due operation 246 is included in an Invoice Verification Out interface 248.

An asynchronous outbound process agent 252 can invoke a Notify of Expected Delivery operation 254. The Notify of Expected Delivery operation notifies of an expected delivery. The request can be sent to the Supplier Invoice Processing process component 124. The Notify of Expected Delivery operation 254 is included in a Purchase Order Inbound Delivery Out interface 256.

An asynchronous outbound process agent 260 can invoke a Request Purchase Order Change operation 262. The operation 262 requests a change of a purchase order that was formerly ordered at the supplier. The request can be sent to the Sales Order Processing at Supplier process component 270. The asynchronous outbound process agent 260 can also invoke a Request Purchase Order Cancellation operation 264. The Request Purchase Order Cancellation operation 264 requests a cancellation of the purchase order that was formerly ordered at the supplier. The request can be sent to the Sales Order Processing at Supplier process component 270. The asynchronous outbound process agent 252 can also invoke a Request Purchase Order Creation operation 266. The Request Purchase Order Creation operation 266 requests a purchase order from the supplier. The request can be sent to the Sales Order Processing at Supplier process component 270. The Request Purchase Order Change operation 262, the Request Purchase Order Cancellation operation 264, and the Request Purchase Order Creation operation 266 are included in an Ordering Out interface 268.

The Sales Order Processing at Supplier process component 270 is drawn with dashed lines to indicate that it is used to represent an external system in describing interactions with the external system; this should be understood to require no more of the external system than that it be able to produce and receive messages as required by the process component that interacts with the external system.

As shown in FIG. 2C, an asynchronous outbound process agent 272 can invoke a Notify of Purchase Order operation 275. The Notify of Purchase Order operation 275 is a notification about created, changed or cancelled purchase orders. The asynchronous outbound process agents 272 can send a notification of the purchase order to the External Procurement Trigger and Response process component 277. The Notify of Purchase Order operation 275 is included in an Ordering Notification Out interface 276.

An asynchronous outbound process agent 273 can also invoke the Notify of Purchase Order operation 275. The asynchronous outbound process agent 273 can send the notification about the purchase order to the Project Processing process component 278.

An asynchronous outbound process agent 274 can also invoke the Notify of Purchase Order operation 275. The asynchronous outbound process agent 274 can send the notification about the purchase order to the Internal Request Processing process component 132.

An asynchronous outbound process agent 280 can invoke a Notify of Purchase Order operation 281. The operation 281 notifies about created, changed, or cancelled purchase orders. The operation 281 is included in a Sales and Purchasing Accounting Out interface 282. The asynchronous outbound process agent 280 can send the notification about the purchase order to the Accounting process component 283.

An asynchronous outbound process agent 284 can invoke a Notify of Purchase Order operation 285. The asynchronous outbound process agent 284 can send a notification about the purchase order that has been created, changed, or canceled to the Time and Labor Management process component 287. The Notify of Purchase Order operation 285 is included in an Employee Time Confirmation View or Service Transaction Document Management Out interface 286.

An asynchronous outbound process agent 288 can invoke a Request Supplier Invoice Request operation 289. The operation 289 can request supplier invoice request migration based on the migrated purchase order data and/or purchase order delivery values. The operation 289 is included in a Supplier Invoice Request Migration Out interface 290. The asynchronous outbound process agent 288 can send the notification about the purchase order to the Supplier Invoice Processing process component 124.

A Sales Order Processing at Supplier operation 292 can send a message to the Purchase Order Processing process component 104. The message can be received in a Create Purchase Order Confirmation operation 293. The operation 293 is included in an Ordering In interface 294. The Create Purchase Order Confirmation operation 293 creates a purchase order confirmation according to the confirmation, partial confirmation, or proposed changes sent from the seller to the buyer concerning the requested delivery of product to trigger the creation of a purchase order confirmation. The operation 293 uses an asynchronous inbound process agent 295 to update the Purchase Order Confirmation business object 108. The Purchase Order Confirmation business object 108 represents a confirmation from a seller to deliver a specified quantity of goods, or perform a specified service, at a specified price within a specified time.

The Sales Order Processing at Supplier process component 292 is drawn with dashed lines to indicate that it is used to represent an external system in describing interactions with the external system; this should be understood to require no more of the external system than that it be able to produce and receive messages as required by the process component that interacts with the external system.

Figure 3A:
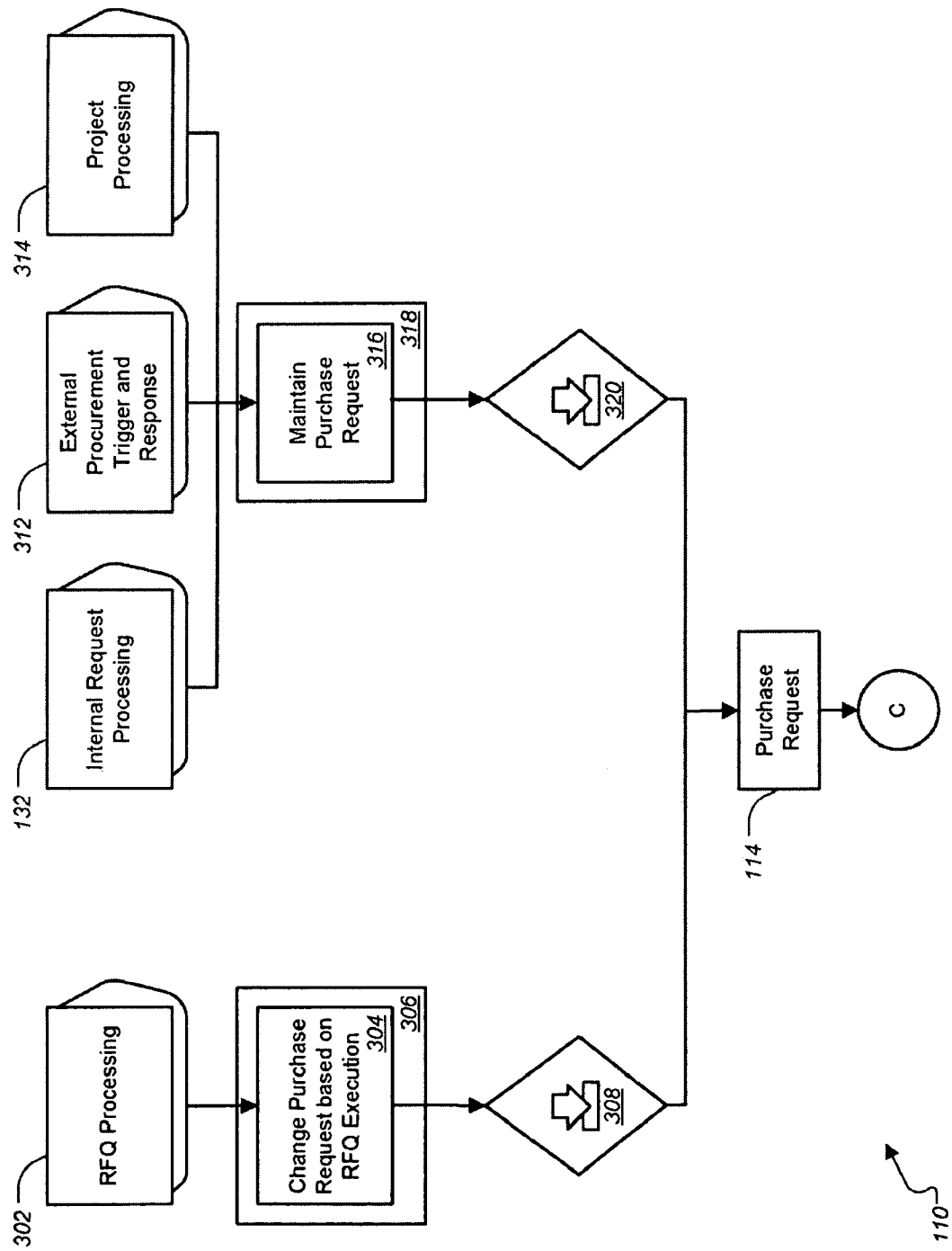
FIGS. 3A and 3B are block diagrams collectively showing a Purchase Request Processing process component.
Figure 3B:
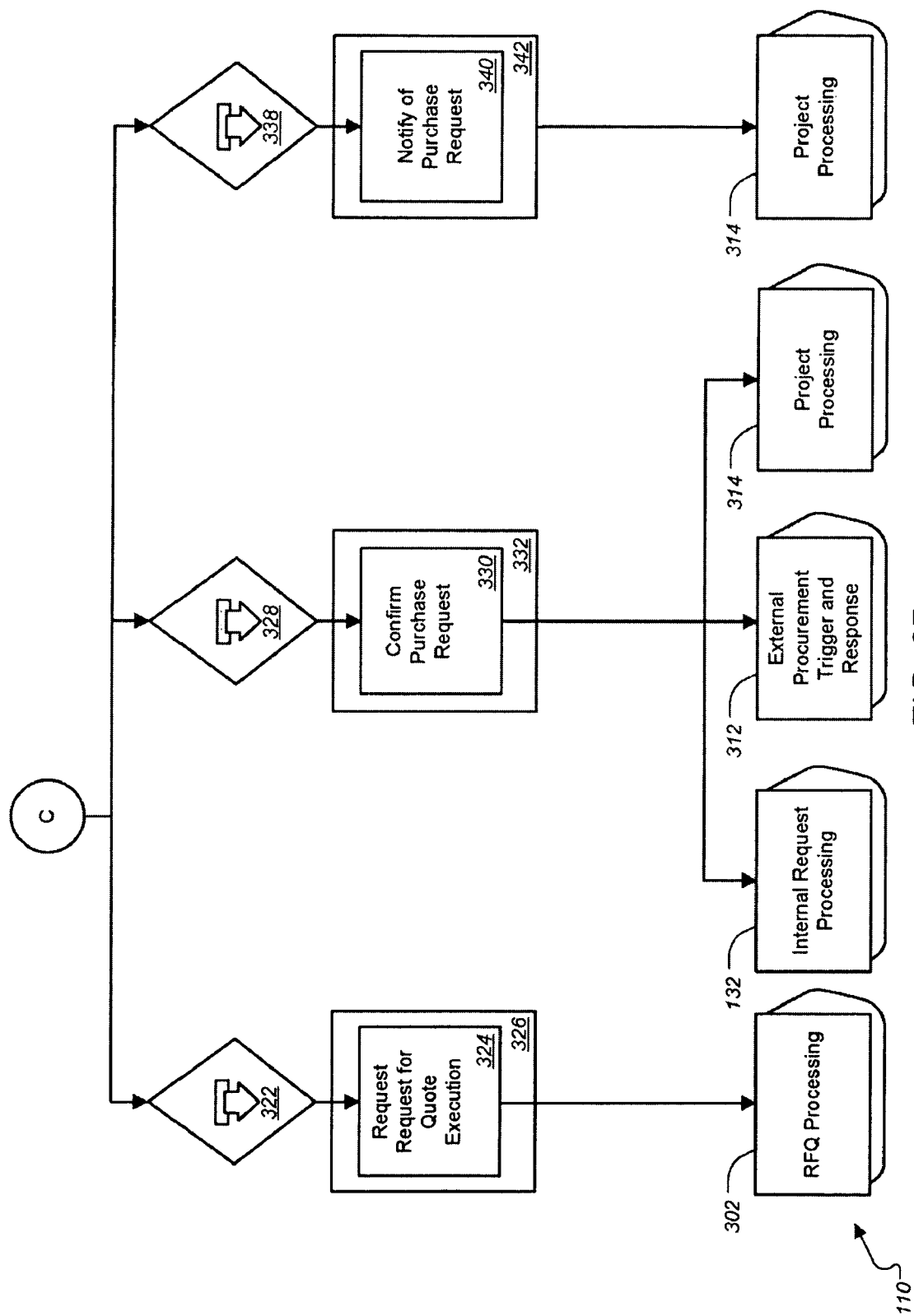

FIGS. 3A and 3B are block diagrams collectively showing the Purchase Request Processing process component 110 (FIG. 1A). For convenience in describing this process component, a number of other process components are shown in the figures; these other process components are not part of the process component being described. These other process components are the RFQ Processing process component 302, the Internal Request Processing process component 132, the External Procurement Trigger and Response process component 312, and the Project Processing process component 314. These other process components are used to represent software external to the process component in describing its interactions with the external software; however, while the external software can be implemented as such process components, this is not required.

The RFQ Processing process component 302 can send a message to the Purchase Request Processing process component 110. The message can be received in a Change Purchase Request operation 304. The operation 304 can change purchase request based on request for quote execution. The operation 304 is included in a Request for Quote In interface 306. The Change Purchase Request operation 304 can use an asynchronous inbound process agent 308 to update the Purchase Request business object 114. The purchase request business object 114 represents a request or instruction to the purchasing department to purchase specified goods or services in specified quantities at a specified price within a specified time.

The Internal Request Processing process component 132, the External Procurement Trigger and Response process component 312, or the Project Processing process component 314 can send a request message to the Maintain Purchase Request process component 316. A Maintain Purchase Request operation 316 can create or update a request from a requester to a purchaser to (externally) procure materials and/or services, i.e. create or update a purchase request. The operation 316 uses an asynchronous inbound process agent 320 to update the Purchase Request business object 114. The Maintain Purchase Request operation 316 is included in a Purchasing In interface 318.

As shown in FIG. 3B, multiple outbound process agents can receive information from the Purchase Request business object 114. For example, a request from outbound agent 322 can receive updated information from the Purchase Request business object 114 and invoke a Request Request for Quote Execution operation 324. The outbound process agent 322 can invoke the operation 324 to update the RFQ Processing process component 302. The Request Request for Quote Execution operation 324 is included in a Request for Quote Out interface 326.

An asynchronous outbound process agent 328 can receive updated information from the Purchase Request business object 114 and invoke a Confirm Purchase Request operation 330. The Confirm Purchase Request operation 330 confirms the creation, change or cancellation of a purchase request to the requester. The asynchronous outbound process agent 328 can invoke the operation 330 to update the Internal Request Processing process component 132, the External Procurement Trigger and Response process component 312, or the Project Processing process component 314. The Confirm Purchase Request operation 330 is included in a Purchasing Notification Out interface 332.

Figure 4A:
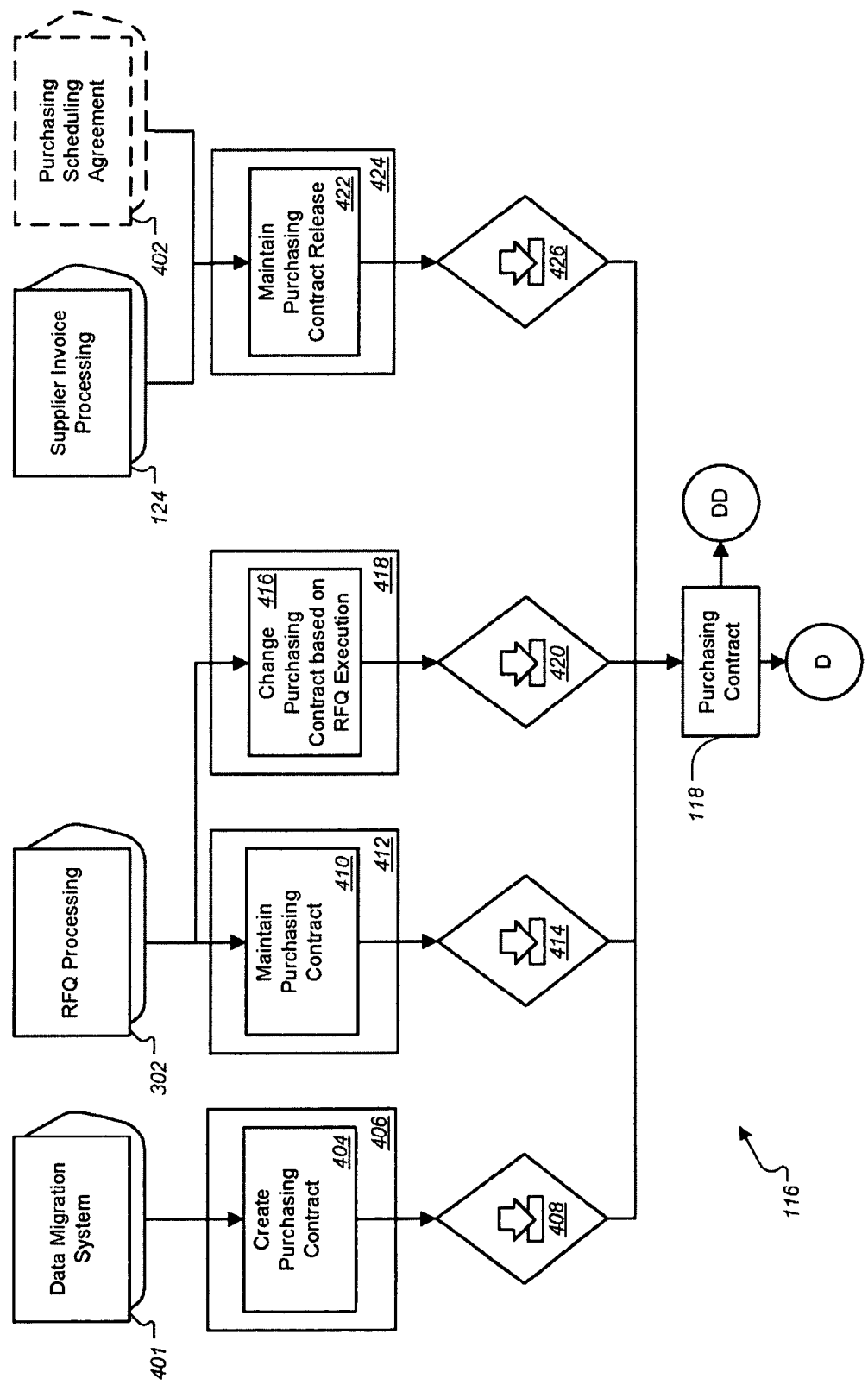
FIGS. 4A, 4B, and 4C are block diagrams collectively showing a Purchasing Contract Processing process component.
Figure 4B:
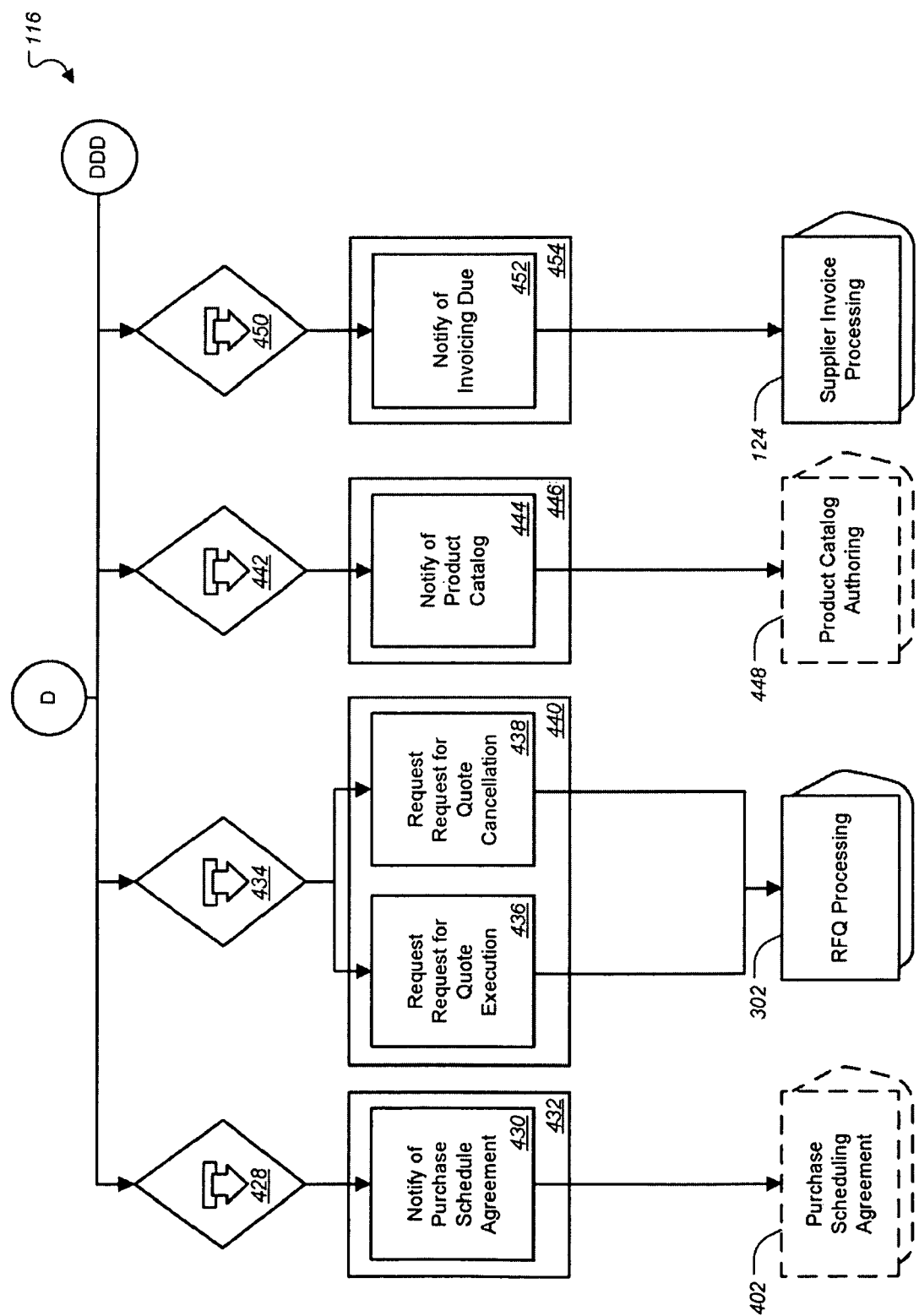
Figure 4C:
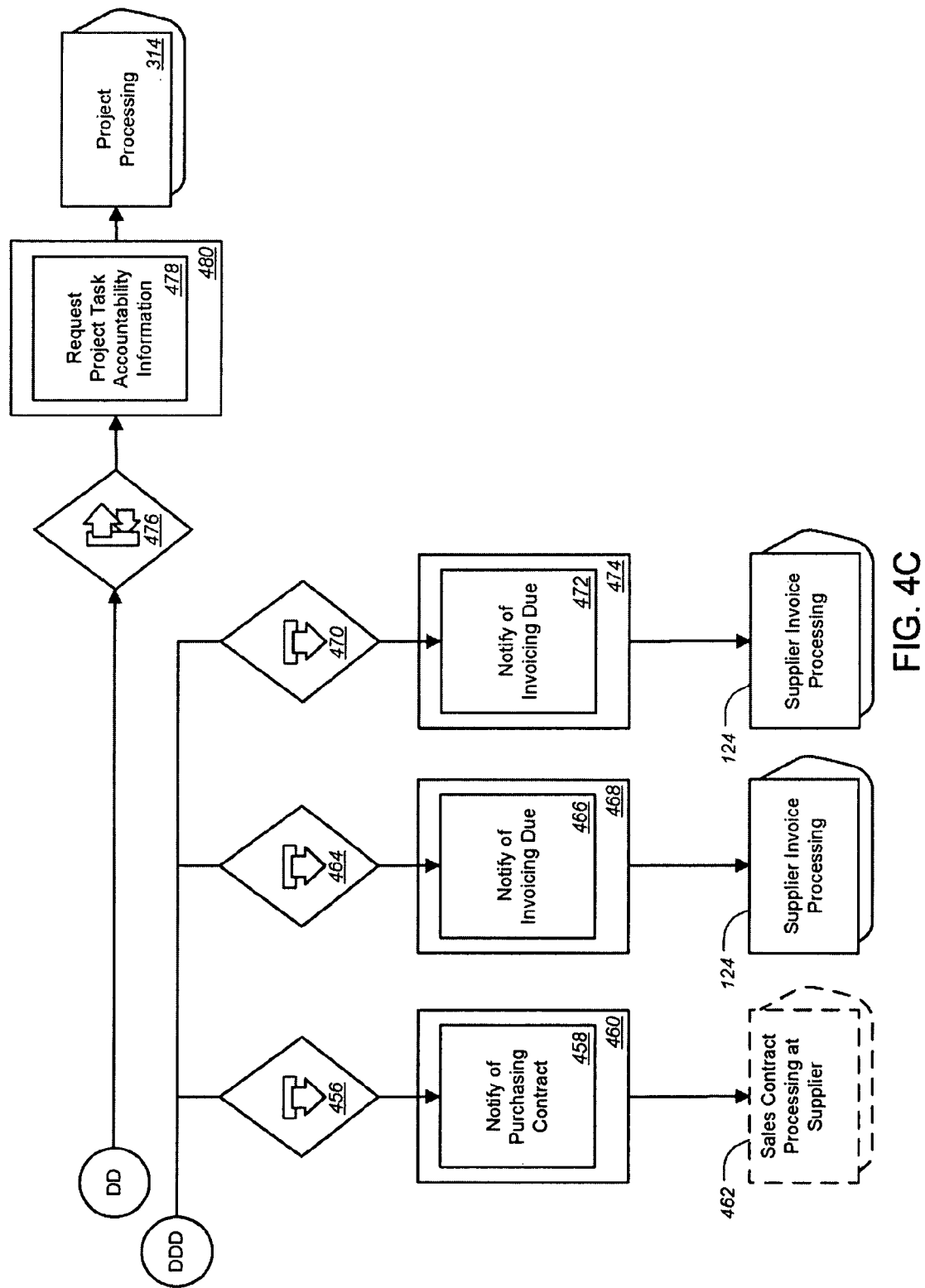

FIGS. 4A, 4B and 4C are block diagrams collectively showing the Purchasing Contract Processing process component 116 (FIG. 1A). For convenience in describing this process component, a number of other process components are shown in the figures; these other process components are not part of the process component being described. These other process components are the Supplier Invoice Processing process component 124, the Data Migration System process component 401, the RFQ Processing process component 302, a Sales Contract Processing at Supplier process component 462, a Purchasing Scheduling Agreement process component 402, and a Product Catalog Authoring process component 448. These other process components are used to represent software external to the process component in describing its interactions with the external software; however, while the external software can be implemented as such process components, this is not required.

As shown in FIG. 4A, the RFQ Processing process component 302 can send a message to the Purchasing Contract Processing process component 118. The message can be received in a Maintain Purchasing Contract operation 410. The operation 410 can create or update a purchasing contract. The operation 410 is included in a Purchasing Contract In interface 412. The Maintain Purchasing Contract operation 410 uses an asynchronous inbound process agent 414 to update the Purchasing Contract business object 118. The Purchasing Contract business object 118 represents a legally binding purchase agreement that contains special conditions that are negotiated between a buyer and a seller covering goods to be supplied or services to be performed. It is valid for a specific period, during which goods and services are released against the contract.

A Change Purchasing Contract based on RFQ Execution operation 416 can also receive a message from the RFQ Processing process component 302. The operation 416 can confirm the creation of an RFQ and maintain the reference of the newly created request for quote in the purchasing contract. The operation 416 is included in a Request for Quote In interface 418. The Change Purchasing Contract based on RFQ Execution operation 416 can use an asynchronous inbound process agent 420 to update the Purchasing Contract business object 118.

The Data Migration System process component 401 can send a message to the Purchasing Contract Processing process component 118. The message can be received in a Create Purchasing Contract operation 404. The operation 404 creates a purchasing contract based on migrated data. The operation 404 is included in the Migration In interface 406. The Create Purchasing Contract operation 404 can use an asynchronous inbound process agent 408 to update the Purchasing Contract business object 118.

The Supplier Invoice Processing process component 124 can send a message to the Purchasing Contract Processing process component 116. The message can be received in a Maintain Purchasing Contract Release operation 422. Also, the Purchasing Scheduling Agreement process component 402 can be received in the Maintain Purchasing Contract Release operation 422. The operation 422 creates or updates releases in the purchasing contract. The operation 422 is included in a Contract Release In interface 424. The Maintain Purchasing Contract Release operation 422 can use an asynchronous inbound process agent 426 to update the Purchasing Contract business object 118.

The Purchasing Contract business object 118 can receive updated information and send the update into other components to perform further operations. As shown in FIG. 4B, multiple outbound process agents can receive information from the Purchasing Contract business object 118.

An asynchronous outbound process agent 428 can invoke a Notify of Purchase Schedule Agreement operation 430. The operation 430 can notify if there is a purchase scheduling agreement. The asynchronous outbound process agent 428 can invoke the operation 430 to update the Purchase Scheduling Agreement process component 402. This process component is drawn with dashed lines to indicate that it is used to represent an external system in describing interactions with the external system; this should be understood to require no more of the external system than that it be able to produce and receive messages as required by the process component that interacts with the external system. The Notify of Purchase Schedule Agreement operation 430 is included in a Purchase Schedule Agreement Replication Out interface 432.

An asynchronous outbound process agent 434 can invoke a Request Request for Quote Execution operation 436 or a Request Request for Quote Cancellation operation 438. The Request Request for Quote Execution operation 436 creates a request for quote request from a purchasing contract that is in the negotiation process or inform existing request for quote requests about a canceled negotiation process. The Request Request for Quote Cancellation operation 438 requests the cancellation of a request for quote for a running purchasing contract negotiation process. For example, the outbound process agent 434 can invoke the operation 436 to send a message to the RFQ Processing process component 302 or the outbound process agent 434 can invoke the operation 438 to send a message to the RFQ Processing process component 302.

An asynchronous outbound process agent 442 can invoke a Notify of Product Catalog operation 444. The operation 444 can notify if there is a product catalog. The asynchronous outbound process agent 442 can invoke the operation 444 to update the Product Catalog Authoring process component 448. This process component is drawn with dashed lines to indicate that it is used to represent an external system in describing interactions with the external system; this should be understood to require no more of the external system than that it be able to produce and receive messages as required by the process component that interacts with the external system. The Notify of Product Catalog operation 430 is included in a Product Catalogue Authoring Out interface 446.

An asynchronous outbound process agent 450 can invoke a Notify of Invoicing Due operation 452. The operation 452 creates a new supplier invoicing request or updates an existing supplier invoice request from a released purchasing contract. For example, the outbound process agent 450 can invoke the operation 452 to send a message to the Supplier Invoice Processing process component 124. The Notify of Invoicing Due operation 452 is included in an Invoice Verification Out interface 454.

An asynchronous outbound process agent 456 can invoke a Notify of Purchasing Contract operation 458. The operation 458 can notify the supplier about a purchasing contract when it is released and is used in operational purchasing processes. For example, the outbound process agent 456 can invoke the operation 458, in a Contracting Notification Out interface 460, to send a message regarding the purchasing contract to a Sales Contract Processing at Supplier process component 462. This process component is drawn with dashed lines to indicate that it is used to represent an external system in describing interactions with the external system; this should be understood to require no more of the external system than that it be able to produce and receive messages as required by the process component that interacts with the external system.

An asynchronous outbound process agent 464 can invoke a Notify of Project Task Assignment operation 466. The operation 466 can notify of purchasing contract project task assignments. For example, the outbound process agent 464 can invoke the operation 466 to send a message regarding a project task assignment to a Supplier Invoice Processing process component 124. The Notify of Project Task Assignment operation 466 is included in a Project Task Assignment Notification Out interface 468.

An asynchronous outbound process agent 470 can invoke a Confirm Purchasing Contract operation 472. The operation 472 can confirm a purchasing contract creation and/or update. For example, the outbound process agent 470 can invoke a Confirm Purchasing Contract operation 472 to send a message regarding confirmation of a new creation of a purchasing contract to a Supplier Invoice Processing process component 124. The Confirm Purchasing Contract operation 472 is included in a Purchasing Contract Out interface 474.

A synchronous outbound process agent 476 can invoke a Request Project Task Accountability Information operation 478. The operation 478 can check the project task accountability. For example the synchronous outbound process agent 476 can evoke a Request Project Task Accountability Information operation 478 to send a message regarding the project task accountability information to a Project Processing process component 314. The Request Project Task Accountability Information operation 478 is included in Project Task Accountability Out interface 480.

Figure 5A:
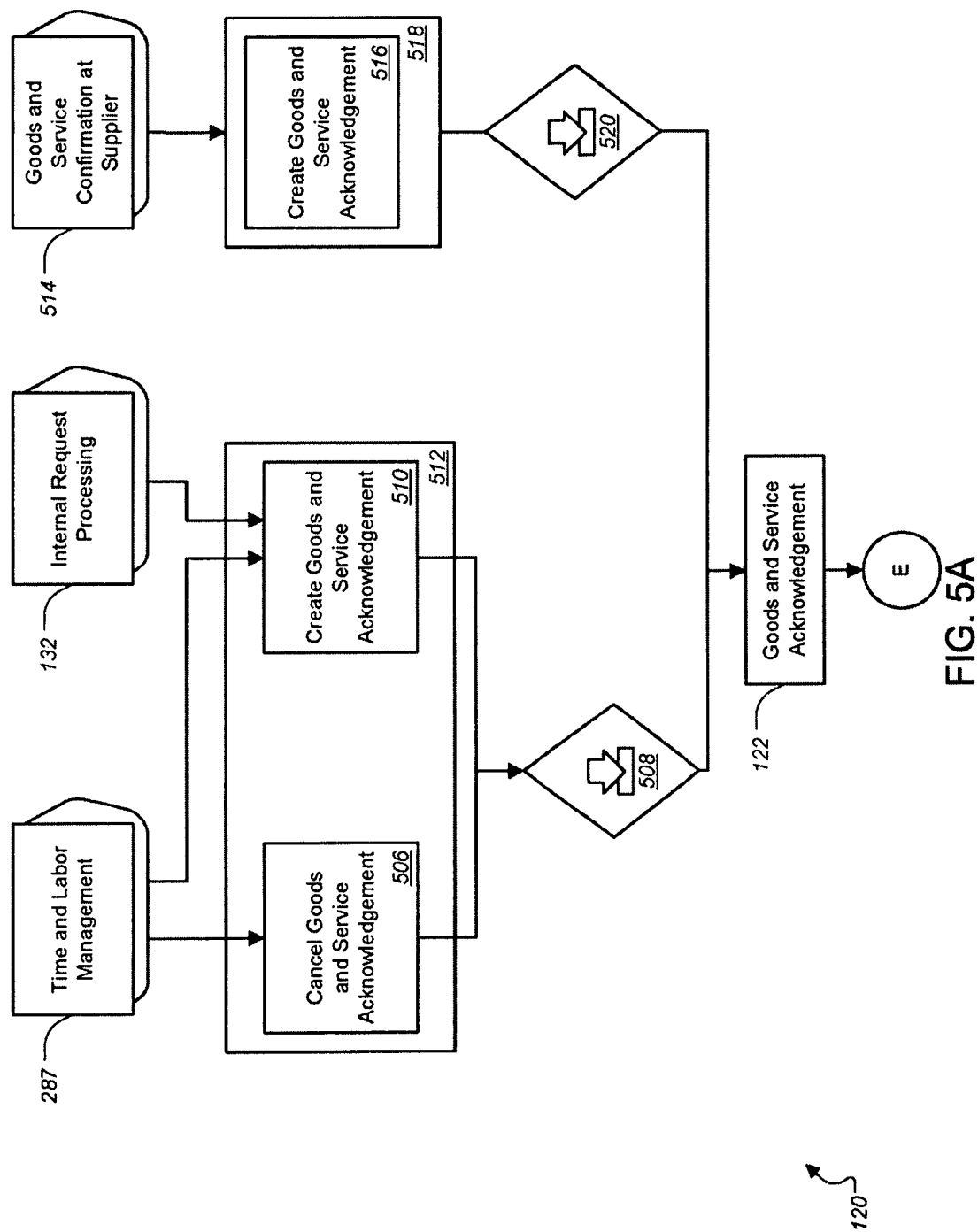
FIGS. 5A and 5B are block diagrams collectively showing a Goods and Service Acknowledgement process component.
Figure 5B:
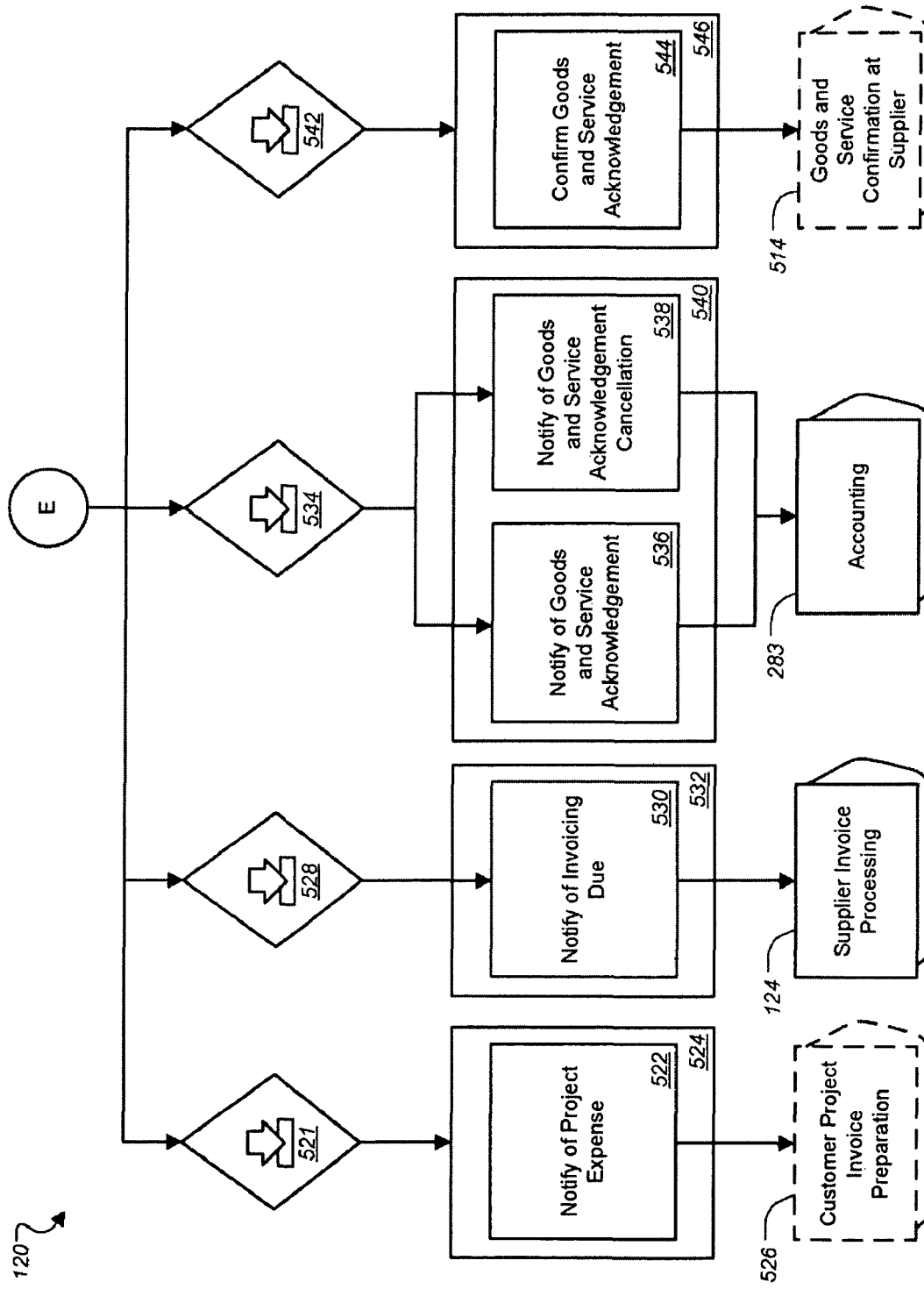

FIGS. 5A and 5B are block diagrams collectively showing the Goods and Service Acknowledgement process component 120 (FIG. 1A). For convenience in describing this process component, a number of other process components are shown in the figures; these other process components are not part of the process component being described. These other process components are the Time and Labor Management process component 287, the Internal Request Processing process component 132, the Supplier Invoice Processing process component 124, the Goods and Service Confirmation at Supplier process component 514, Customer Project Invoice Preparation process component 526, and the Accounting process component 283. These other process components are used to represent software external to the process component in describing its interactions with the external software; however, while the external software can be implemented as such process components, this is not required.

As shown in FIG. 5A, The Time and Labor Management process component 287 can send a message to the Goods and Service Acknowledgement process component 120. The message can be received in a Cancel Goods and Service Acknowledgement operation 506. The operation 506 can cancel a goods and service acknowledgement based on time recording cancellation. The asynchronous inbound process agent 508 can update the Goods and Service Acknowledgement business object 122 with the cancellation information. The Goods and Service Acknowledgement business object 122 represents a report about the receipt of goods and services.

The Internal Request Processing process component 132 can send a message to the Goods and Service Acknowledgement process component 120. The message can be received in a Create Goods and Service Acknowledgement operation 510. The operation 510 creates a goods and service acknowledgement based on time recording or express confirmation in internal request processing. An update regarding the created acknowledgement can be sent to the Goods and Service Acknowledgement business object 122 using the asynchronous inbound process agent 508. The Cancel Goods and Service Acknowledgement operation 506 and the Create Goods and Service Acknowledgement operation 510 are included in an Internal Acknowledgement In interface 512. The Goods and Service Acknowledgement business object 122, in some implementations represents a document that reports the receipt of goods and services.

The Goods and Service Confirmation at Supplier process component 514 can send a message to the Goods and Service Acknowledgement process component 120. The message can be received in a Create Goods and Service Acknowledgement operation 510. The operation 516 can create a goods and service acknowledgement. A creation acknowledgement can be sent to the Goods and Service Acknowledgement business object 122 using the asynchronous inbound process agent 520. The Create Goods and Service Acknowledgement operation is included in an Acknowledgement In interface 518.

As shown in FIG. 5B, multiple outbound process agents can also receive information from the Goods and Service Acknowledgement business object 122.

An asynchronous outbound process agent 521 can invoke a Notify of Project Expense operation 522. The outbound process agent 521 can send a notification on a project expense for items in a purchase order. The notification can be sent to the Customer Project Invoice Preparation processing component 526. This process component is drawn with dashed lines to indicate that it is used to represent an external system in describing interactions with the external system; this should be understood to require no more of the external system than that it be able to produce and receive messages as required by the process component that interacts with the external system.

The Notify of Project Expense operation 522 is included in a Project Expense Notification interface 524.

An asynchronous outbound process agent 528 can invoke a Notify of Invoicing Due operation 530. The outbound process agent 528 can send a notification of an invoice due for goods and services in a purchase order. The notification can be sent to the Supplier Invoice Processing process component 124. The Notify of Invoicing Due operation 530 is included in an Invoice Verification Out interface 532.

An asynchronous outbound process agent 534 can invoke a Notify of Goods and Service Acknowledgement operation 536. The operation 536 can notify a financial accounting about delivered goods and rendered services of a goods and service acknowledgement. The notification can be sent to the Accounting process component 283. The asynchronous outbound process agent 534 can also invoke a Notify of Goods and Service Acknowledgement Cancellation operation 538. The operation 538 can notify a financial accounting about goods and services acknowledgement cancellation. The notification can be sent to the Accounting process component 283. The Notify of Goods and Service Acknowledgement operation 536 and the Notify of Goods and Service Acknowledgement Cancellation operation 538 are included in a Goods and Service Accounting Out interface 540.

An asynchronous outbound process agent 542 can invoke a Confirm Goods and Service Acknowledgement operation 544. The operation 544 can confirm a goods and services acknowledgement. The notification can be sent to the Goods and Service Confirmation at Supplier process component 514. This process component is drawn with dashed lines to indicate that it is used to represent an external system in describing interactions with the external system; this should be understood to require no more of the external system than that it be able to produce and receive messages as required by the process component that interacts with the external system. The Confirm Goods and Service Acknowledgement 544 is included in a Acknowledgement Out interface 546.

FIGS. 6A, 6B, 6C, 6D, and 6E are block diagrams collectively showing the Supplier Invoice Processing process component 124 (FIG. 1B). For convenience in describing this process component, a number of other process components are shown in the figures; these other process components are not part of the process component being described. These other process components are the Purchase Order Processing process component 104, an Inbound Delivery Processing process component 210, the Goods and Service Acknowledgement process component 122, the Purchasing Contract Processing process component 116, a Customer Invoice Processing at Supplier process component 622, an Internal Request Processing process component 620, a Customer Invoice Processing process component 650, a Purchasing Contract Processing process component, a Balance of Foreign Payment Management process component, the Accounting process component 283, a Supplier Invoice Verification Exception Resolution at Processor process component 694, and a Due Item Processing process component 668. These other process components are used to represent software external to the process component in describing its interactions with the external software; however, while the external software can be implemented as such process components, this is not required. The Supplier Invoice Processing process component 124 also includes the Evaluated Receipt Settlement Run business object 127 that creates supplier invoices based on a selection of purchase orders, confirmed inbound deliveries, and goods and service acknowledgements.

A Maintain Invoice Request operation 614 can send information using an asynchronous inbound process agent 618 to update the Supplier Invoice Request business object 126. The Supplier Invoice Request business object 126 can be a request sent to invoice verification advising that a supplier invoice for specified quantities and prices is expected or is to be created through evaluation settlement. The operation 614 can create or update a reference object in the Supplier Invoice Processing deployment unit 122 in order to perform invoice verification with reference to a purchase order for example without having to access other deployment units. The reference object is used for checks against the preceding documents and to make proposals for invoice entry. The operation 614 can send a request to update the Supplier Invoice Request business object 126 if one or more messages are received from the Purchase Order Processing process component 104, the Inbound Delivery Processing process component 201, the Goods and Service Acknowledgement process component 122, or the Purchasing Contract Processing process component 116. The Maintain Invoice Request operation 614 is included in an Invoice Verification In interface 616.

A Create Supplier Invoice Request operation 608 can send information using an asynchronous inbound process agent 612 to update the Supplier Invoice Request business object 126. The operation 608 can create a supplier invoice request based on a migrated purchase order and/or based on migrated actual values of the migrated purchase order. The Create Invoice operation 608 is included in an Supplier Invoice Request Migration In interface 610.

An asynchronous outbound process agent 684 can invoke a Notify of Invoice Values operation 685. The outbound process agent 684 can send a notification to the Purchase Order that at least parts of it have already been invoiced. The notification can be sent to the Purchase Order Processing process component 104. The Notify of Invoice Values operation 685 is included in an Invoice Verification Out interface 686.

Figure 6A:
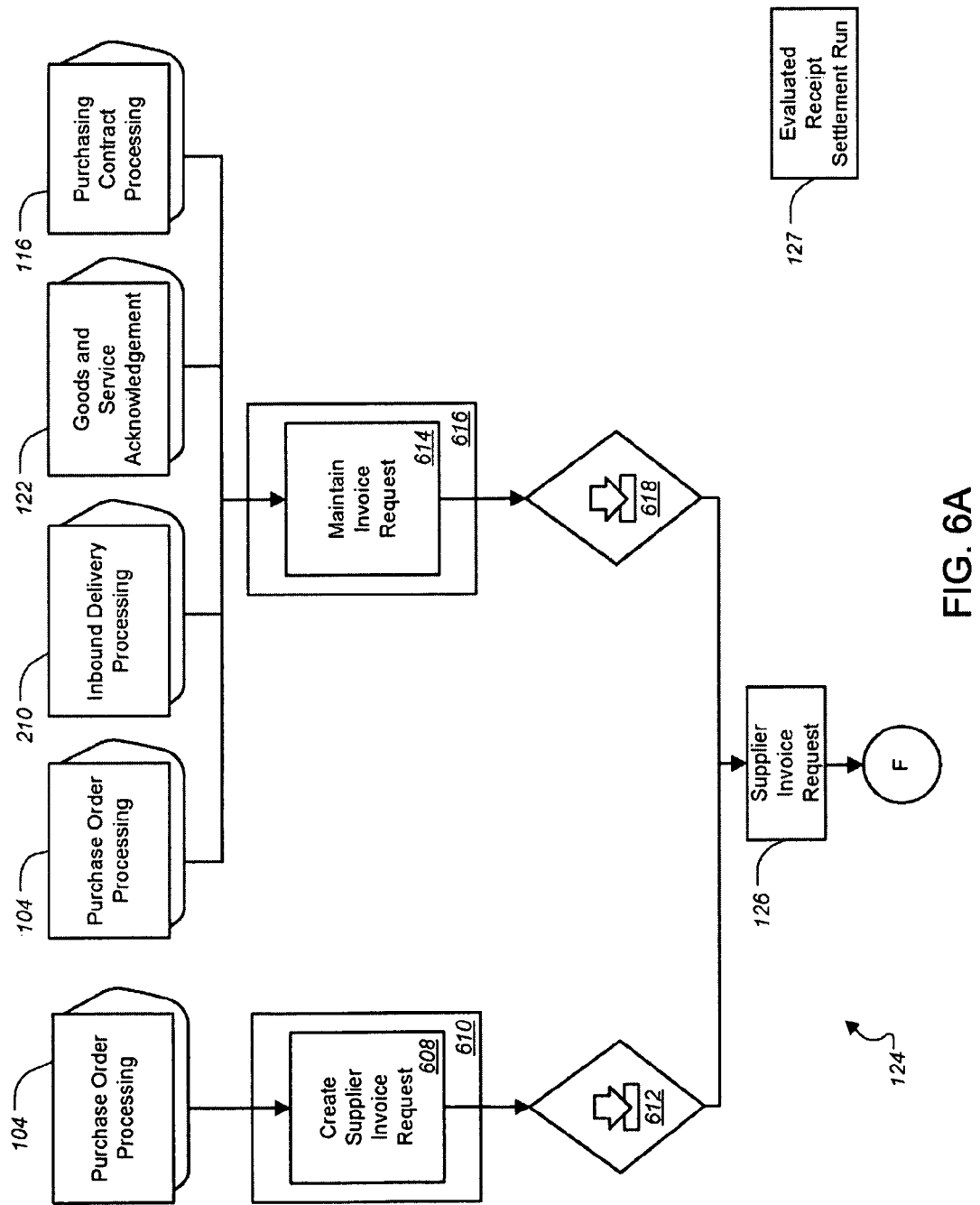
FIGS. 6A, 6B, 6C, 6D, and 6E are block diagrams collectively showing a Supplier Invoice Processing process component.
Figure 6B:
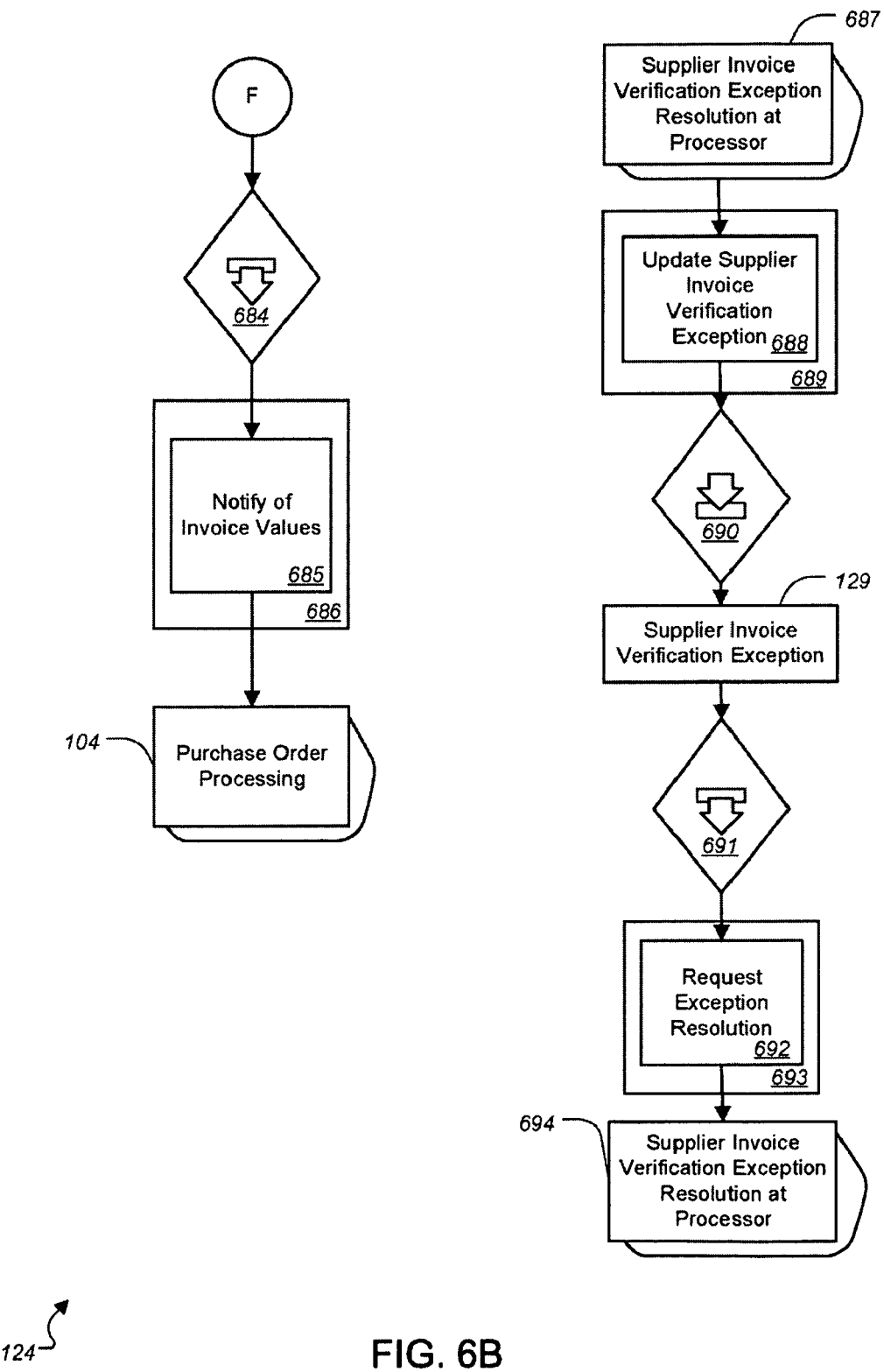

As shown in FIG. 6B, The Supplier Invoice Verification Exception Resolution at Processor process component 687 can send a message to the Supplier Invoice Processing process component 124. The message can be received in an Update Supplier Invoice Verification Exception operation 688. The Update Supplier Invoice Verification Exception operation 688 updates a supplier invoice verification exception based on the changes made by an external party. The operation 688 uses an asynchronous inbound process agent 690 to update the Supplier Invoice Verification Exception business object 129. The Update Supplier Invoice Verification Exception operation 688 is included in an Exception Resolution In interface 689. The Supplier Invoice Verification Exception business object 129 represents a group of related issues arising during a supplier invoice verification process. The issues causing the exception are bundled according to certain business criteria. A complex follow-up clarification process is used to resolve the issues.

The Supplier Invoice Verification Exception business object 129 can receive updated information and send the update into other components to perform further operations. An asynchronous outbound process agent 691 invokes a Request Exception Resolution operation 692. The Request Exception Resolution operation 692 requests the clarification of a supplier invoice verification exception from an external party. The asynchronous outbound process agent 691 can use the Request Exception Resolution operation 692 to update the Supplier Invoice Verification Exception Resolution at Processor process component 694. The Request Exception Resolution operation 692 is included in an Exception Resolution Out interface 693.

A Create Invoice operation 624 can send information using an asynchronous inbound process agent 628 to update the Supplier Invoice business object 128. The operation 624 can create supplier invoices from legally binding claims or liabilities for delivered goods and rendered services. The Create Invoice operation 624 is included in an Internal Invoicing In interface 626.

The Internal Request Processing process component 620 is drawn with dashed lines to indicate that it is used to represent an external system in describing interactions with the external system; this should be understood to require no more of the external system than that it be able to produce and receive messages as required by the process component that interacts with the external system.

A Create Invoice operation 630 can send information using an asynchronous inbound process agent 634 to update the Supplier Invoice business object 128. The operation 630 can create supplier invoices from legally binding claims or liabilities for delivered goods and rendered services. The Create Invoice operation 630 is included in an Invoicing In interface 632.

A Create Invoice based on Attachment operation 636 can send information using an asynchronous inbound process agent 640 to update the Supplier Invoice business object 128. The operation 620 can send a supplier invoice request to update the Supplier Invoice business object 128 if one or more messages is received from the Customer Invoice Processing at Supplier process component 622. The Create Invoice operation 636 is included in an Image Recognition Invoicing In interface 638.

The Customer Invoice Processing at Supplier process component 622 is drawn with dashed lines to indicate that it is used to represent an external system in describing interactions with the external system; this should be understood to require no more of the external system than that it be able to produce and receive messages as required by the process component that interacts with the external system.

Figure 6C:
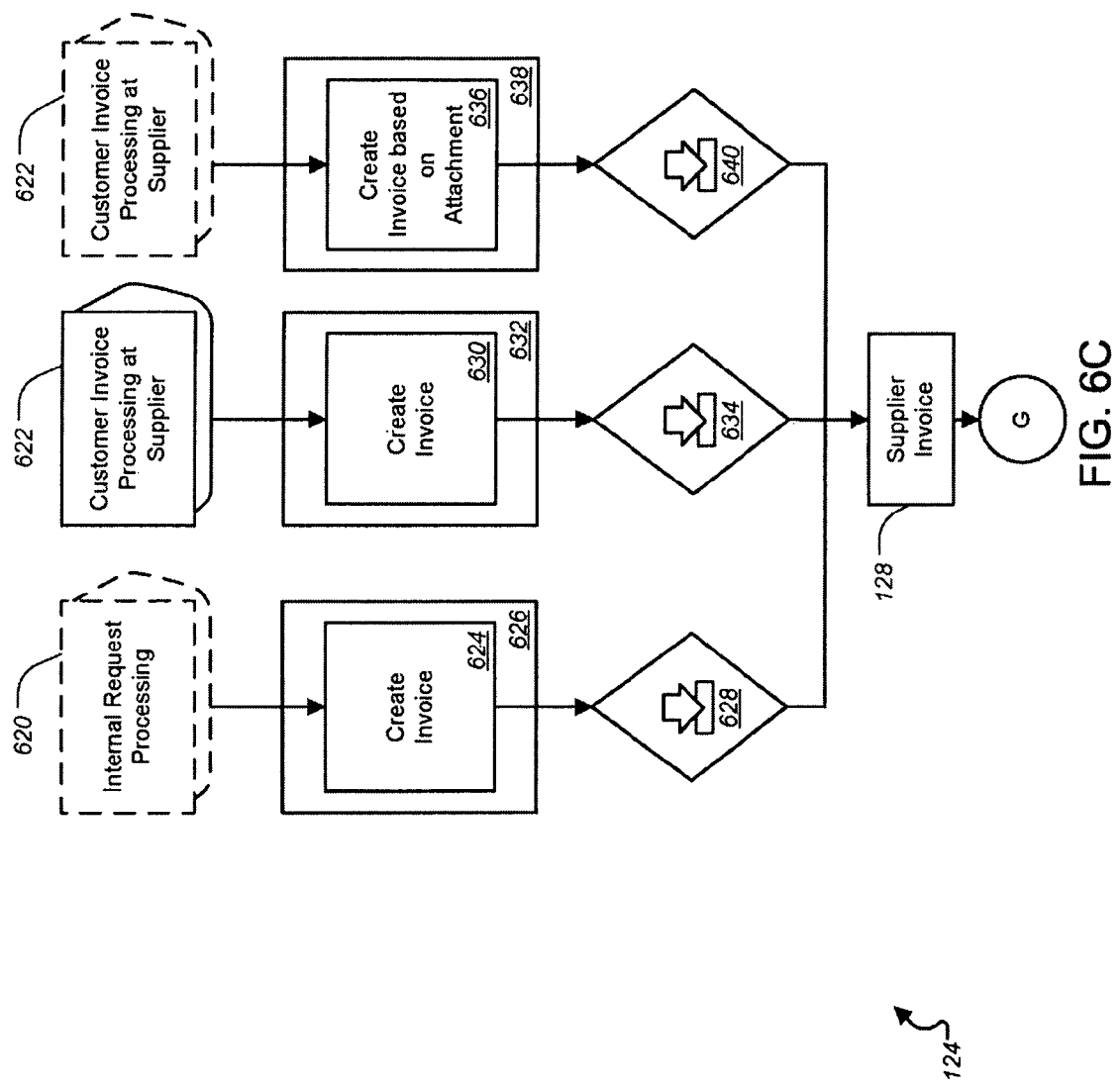
Figure 6D:
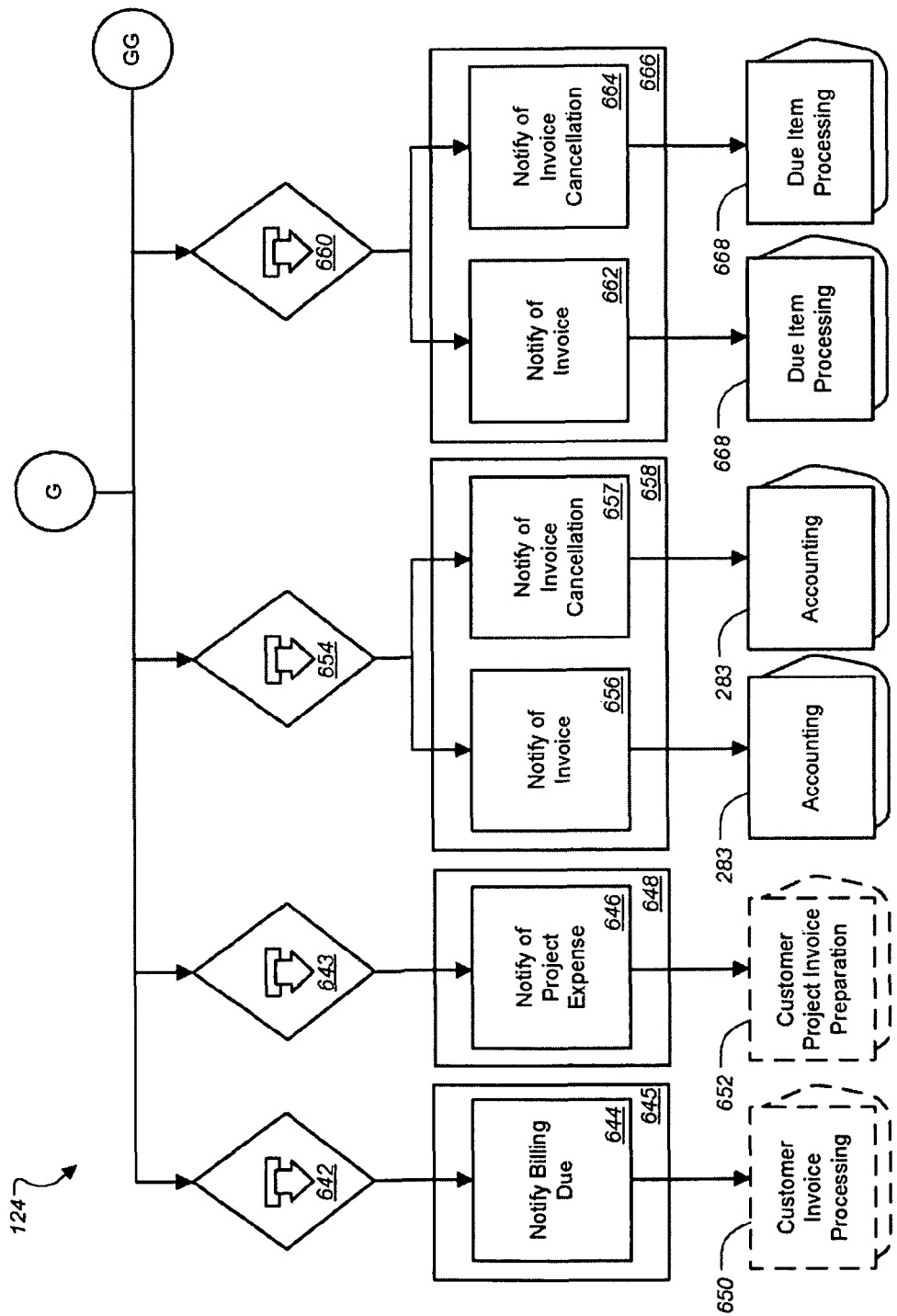
Figure 6E:
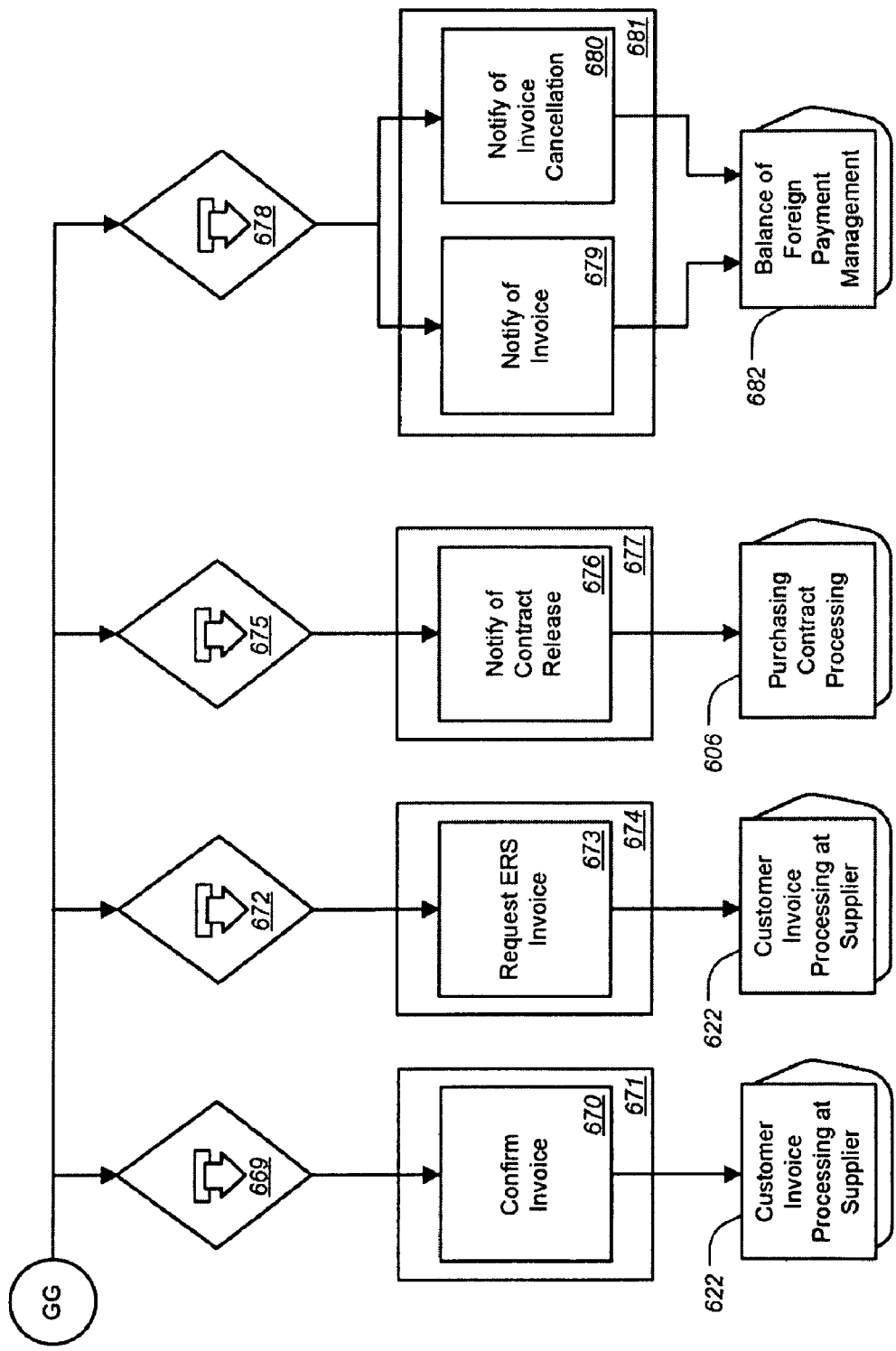

The Supplier Invoice Request business object 126 can receive updated information and send the update into other components to perform further operations. The Supplier Invoice Request business object 126 represents a recipient's (usually the purchaser's) obligation to pay the supplier for goods received or services rendered. As shown in FIG. 6C, at least one outbound process agent can receive information from the Supplier Invoice Request business object 126.

As shown in FIG. 6C, multiple outbound process agents can also receive information from the Supplier Invoice business object 128. An outbound process agent 654 can invoke a Notify of Invoice operation 656. The outbound process agent 656 can send a notification to accounting about accounting relevant data from a previously posted supplier invoice that is cancelled. The notification can be sent to the Accounting process component 283. The asynchronous outbound process agent 654 can also invoke a Notify of Invoice Cancellation operation 657. The outbound process agent 654 can send a notification to accounting about accounting relevant data from a previously posted supplier invoice that is canceled. The notification can be sent to the Accounting process component 283. The Notify of Invoice operation 656 and the Notify of Invoice Cancellation operation 657 are included in an Invoice Accounting Out interface 658.

An asynchronous outbound process agent 660 can invoke a Notify of Invoice operation 662. The outbound process agent 660 can send a notification to the due item processing system about payments and taxes that are due based on a posted supplier invoice. The notification can be sent to the Due Item Processing process component 668. The asynchronous outbound process agent 660 can also invoke a Notify of Invoice Cancellation operation 664. The outbound process agent 660 can send a notification to the due item processing system about a previously posted supplier invoice that is canceled. The notification can be sent to the Due Item Processing process component 668. The Notify of Invoice operation 662 and the Notify of Invoice Cancellation operation 664 are included in a Receivables Payables Out interface 666.

An asynchronous outbound process agent 642 can invoke a Notify Billing Due operation 644. The notification can be sent to the Customer Invoice Processing process component 650. The Notify Billing Due operation 644 is included in a Invoice Verification Out interface 645. An asynchronous outbound process agent 643 can invoke a Notify of Project Expense operation 646. The notification can be sent to the Customer Project Invoice Preparation process component 652. The Notify of Project Expense operation 646 is included Project Expense Notification Out interface 648.

An asynchronous outbound process agent 669 can invoke a Confirm Invoice operation 670. The notification can be sent to the Customer Invoice Processing at Supplier process component 622. The Confirm Invoice operation 670 is included in an Invoicing Out interface 671.

An asynchronous outbound process agent 672 can invoke a Request ERS Invoice operation 673. The outbound process agent 672 can inform the seller party about a supplier invoice created by the buyer party using the credit memo procedure (Evaluated Receipt Settlement). The notification can be sent to the Customer Invoice Processing at Supplier process component 622. The Request ERS Invoice operation 673 is included in an ERS Invoicing Out interface 674.

An asynchronous outbound process agent 675 can invoke a Notify of Contract Release operation 676. The outbound process agent 675 can notify the purchasing system about the posting of a supplier invoice that contains a reference to a purchasing contract. The notification can be sent to the Purchasing Contract Processing process component 606. The Notify of Contract Release operation 676 is included in an Contract Release Out interface 677.

An asynchronous outbound process agent 678 can invoke a Notify of Invoice operation 679. The operation 679 can notify the foreign payment processing system about a posted supplier invoice. The notification can be sent to the Balance of Foreign Payment Management process component 682. Also, the asynchronous outbound process agent 678 can invoke a Notify of Invoice Cancellation operation 680. The notification can be sent to the Balance of Foreign Payment Management process component 682. The Notify of Invoice operation 679 and the Notify of Invoice Cancellation operation 680 are include in a Foreign Receivable Payable Notification interface 681.

Figure 7A:
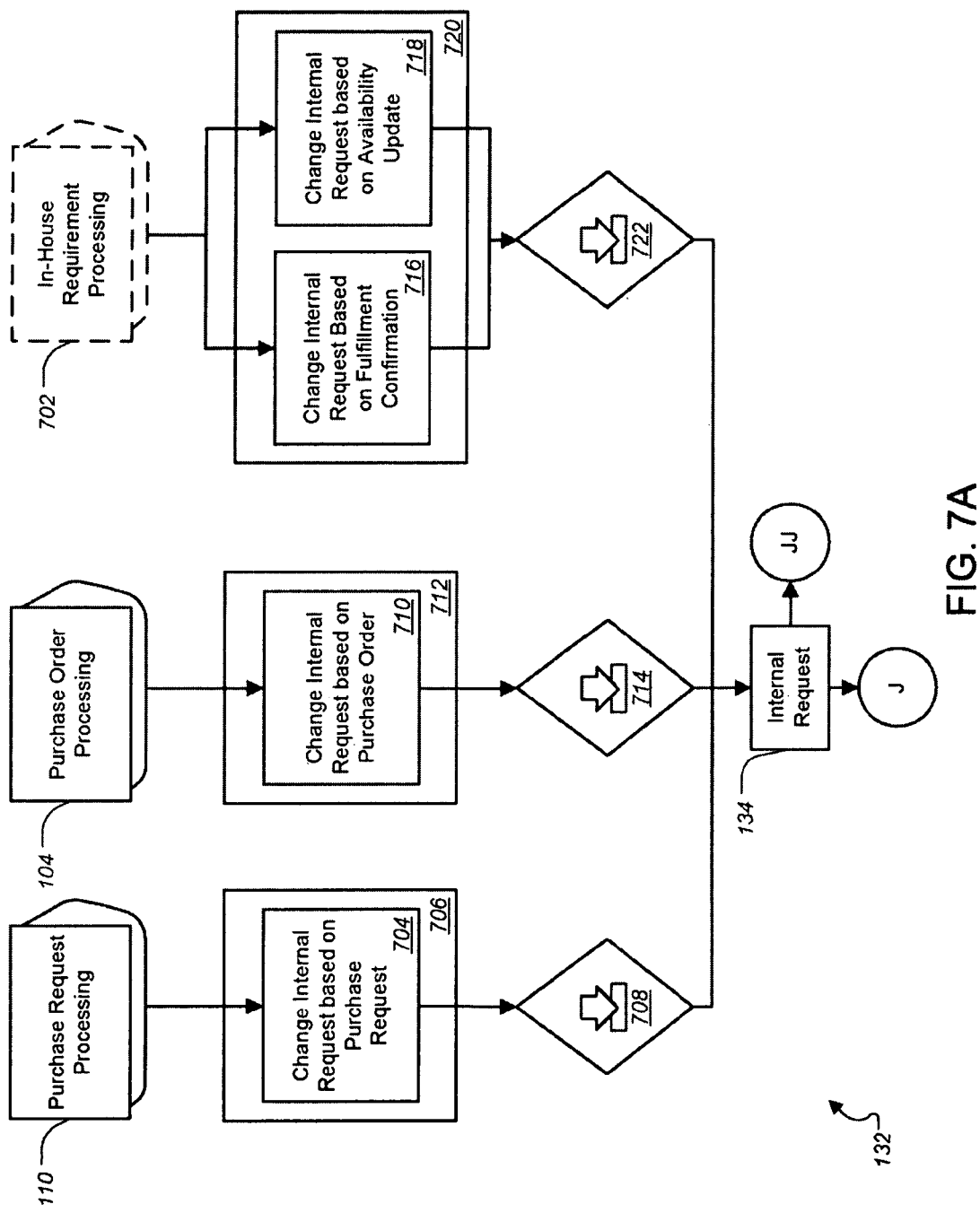
Figure 7C:
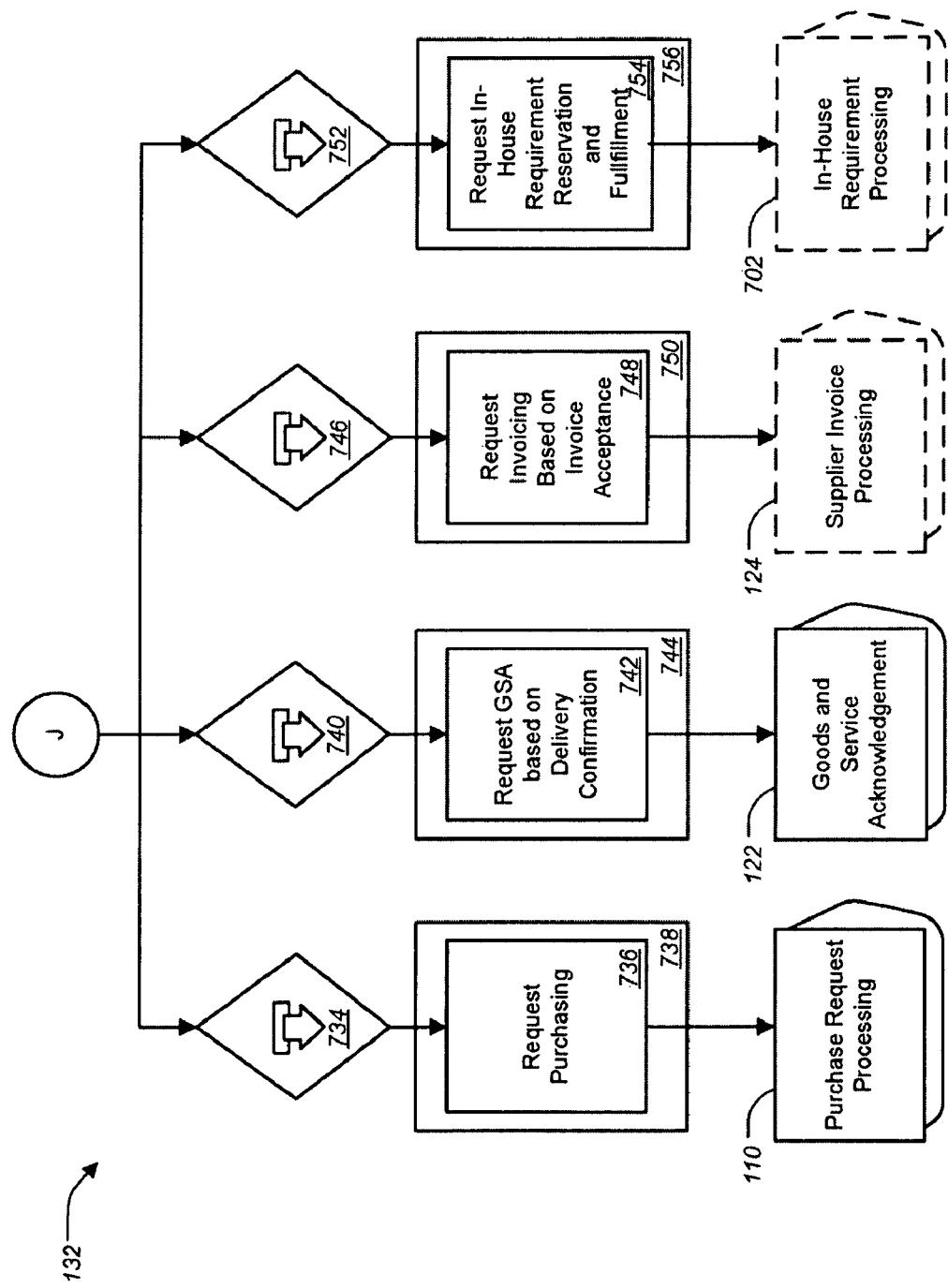

FIGS. 7A, 7B, and 7C are block diagrams collectively showing the Internal Request Processing process component 132. For convenience in describing this process component, a number of other process components are shown in the figures; these other process components are not part of the process component being described. These other process components are the Purchasing Order Processing process component 104, the Purchase Request Processing process component 110, the Goods and Service Acknowledgement process component 122, the Supplier Invoice Processing process component 124, and the In-House Requirement Processing process component 702. These other process components are used to represent software external to the process component in describing its interactions with the external software; however, while the external software can be implemented as such process components, this is not required.

As shown in FIG. 7A, the Purchase Request Processing process component 110 can send a message to the Internal Request Processing process component 132. The message can be received in a Change Internal Request based on Purchase Request operation 704. The operation 704 can change the internal request based on the confirmation of the buyer that informs the requester of the extent to which a requisition has been fulfilled (ordered and rejected quantities) by a purchase request. The Change Internal Request based on Purchase Request operation 704 is included in a Purchasing In interface 706. The operation 704 uses an asynchronous inbound process agent 708 to update the Internal Request business object 134.

The Purchase Order Processing process component 104 can send a message to the Internal Request Processing process component 132. The message can be received in a Change Internal Request based on Purchase Order operation 710. The operation 710 is included in an Ordering Notification In interface 712. The operation 710 can change an internal request based on the notification of the buyer that informs the requester about the progress of procurement, meaning changing of follow-on documents, for example, the creation of goods and service acknowledgement including the amount of received goods as well as the creation of supplier invoices. The Change Internal Request based on Purchase Order operation 710 uses an asynchronous inbound process agent 714 to update the Internal Request business object 134 about a changed internal request.

The In-House Requirement Processing process component 702 can send a message to the Internal Request Processing process component 132. The message can be received in a Change Internal Request Based on Fulfillment Confirmation operation 716. The operation 702 uses an asynchronous inbound process agent 722 to update the Internal Request business object 134. Also, a Change Internal Request based on Availability Update operation 718 uses the asynchronous inbound process agent 722 to update the Internal Request business object 134. The Change Internal Request Based on Fulfillment Confirmation operation 716 and the Change Internal Request based on Availability Update operation 718 are included in an Internal Fulfillment In interface 720.

As show in FIG. 7B, the Internal Request business object 134 can receive updated information and send the update into other components to perform further operations. For example, an update of the Internal Request business object 134 can use a synchronous outbound process agent 724 to invoke a Request Availability Information and Provisional Reservation operation 726. The operation 726 checks the given tasks for availability and provisional reservation. The check takes places in the In-House Requirement Processing process component 702. Also, a synchronous outbound process agent 728 can invoke a Request Availability Information operation 730. The request takes place in the In-House Requirement Processing process component 702. The Request Availability Information and Provisional Reservation operation 726 and Request Availability Information operation 730 are include in a Internal Fulfillment Out interface 732.

The In-House Requirement Processing process component 702 is drawn with dashed lines to indicate that it is used to represent an external system in describing interactions with the external system; this should be understood to require no more of the external system than that it be able to produce and receive messages as required by the process component that interacts with the external system.

As shown in FIG. 7C, other outbound process agents can also receive information from the Internal Request business object 134. An asynchronous outbound process agent 734 can invoke a Request Purchasing operation 736. The Request Purchasing operation 736 can request the procurement of goods and/or services. The Request Purchasing operation 736 is included in a Purchasing Out interface 738. The operation 736 can send an update notification to the Purchase Request Processing process component 110.

An asynchronous outbound process agent 740 can invoke a Request GSA based on Delivery Confirmation operation 742. The operation 742 can request express confirmation of goods and services for an internal request item. The Request GSA based on Delivery Confirmation operation 742 is included in an Internal Acknowledgement Out interface 744. The Request GSA based on Delivery Confirmation operation 742 can send an update notification to the Goods and Service Acknowledgement process component 122.

An asynchronous outbound process agent 746 can invoke a Request Invoicing based on Invoice Acceptance operation 748. The operation 748 can send a request for an invoice based on various invoice acceptance terms. The Invoice Acceptance operation 748 is included in an Internal Invoicing out interface 750. The operation 748 can send an update notification to the Supplier Invoice Processing process component 124.

The Supplier Invoice Processing process component 124 is drawn with dashed lines to indicate that it is used to represent an external system in describing interactions with the external system; this should be understood to require no more of the external system than that it be able to produce and receive messages as required by the process component that interacts with the external system.

An asynchronous outbound process agent 752 can invoke a Request In-House Requirement Reservation and Fulfillment operation 754. The operation 754 can send a request for a requirement, reservation, and fulfillment from in-house. The Request In-House Requirement Reservation and Fulfillment operation 754 is included in an Internal Fulfillment Out interface 756. Request In-House Requirement Reservation and Fulfillment operation 754 can send updates to the In-House Requirement Processing process component 702.

The In-House Requirement Processing process component 702 is drawn with dashed lines to indicate that it is used to represent an external system in describing interactions with the external system; this should be understood to require no more of the external system than that it be able to produce and receive messages as required by the process component that interacts with the external system.

Figure 8A:
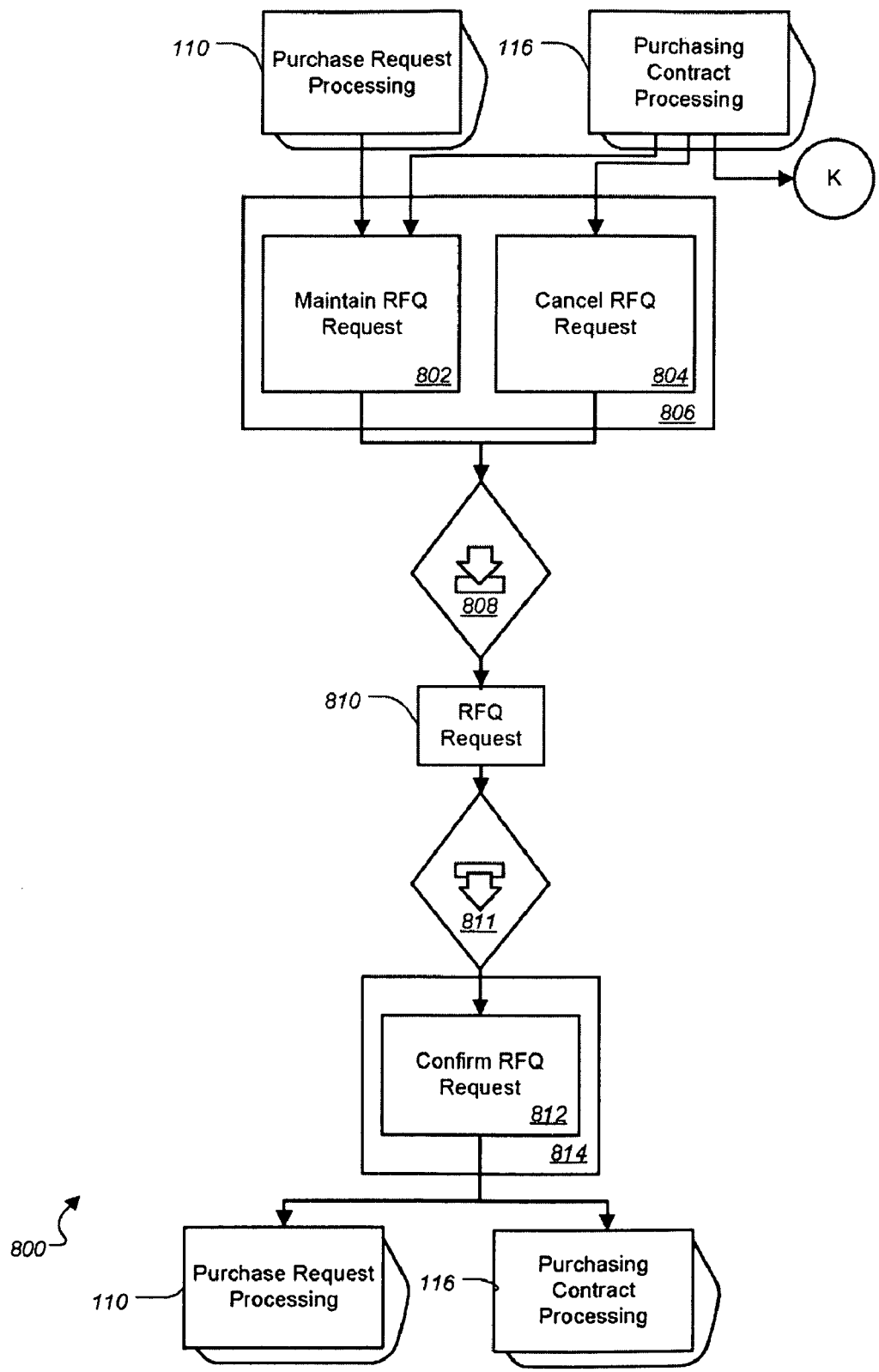
FIGS. 8A, 8B, and 8C are block diagrams collectively showing an RFQ Processing process component.
Figure 8B:
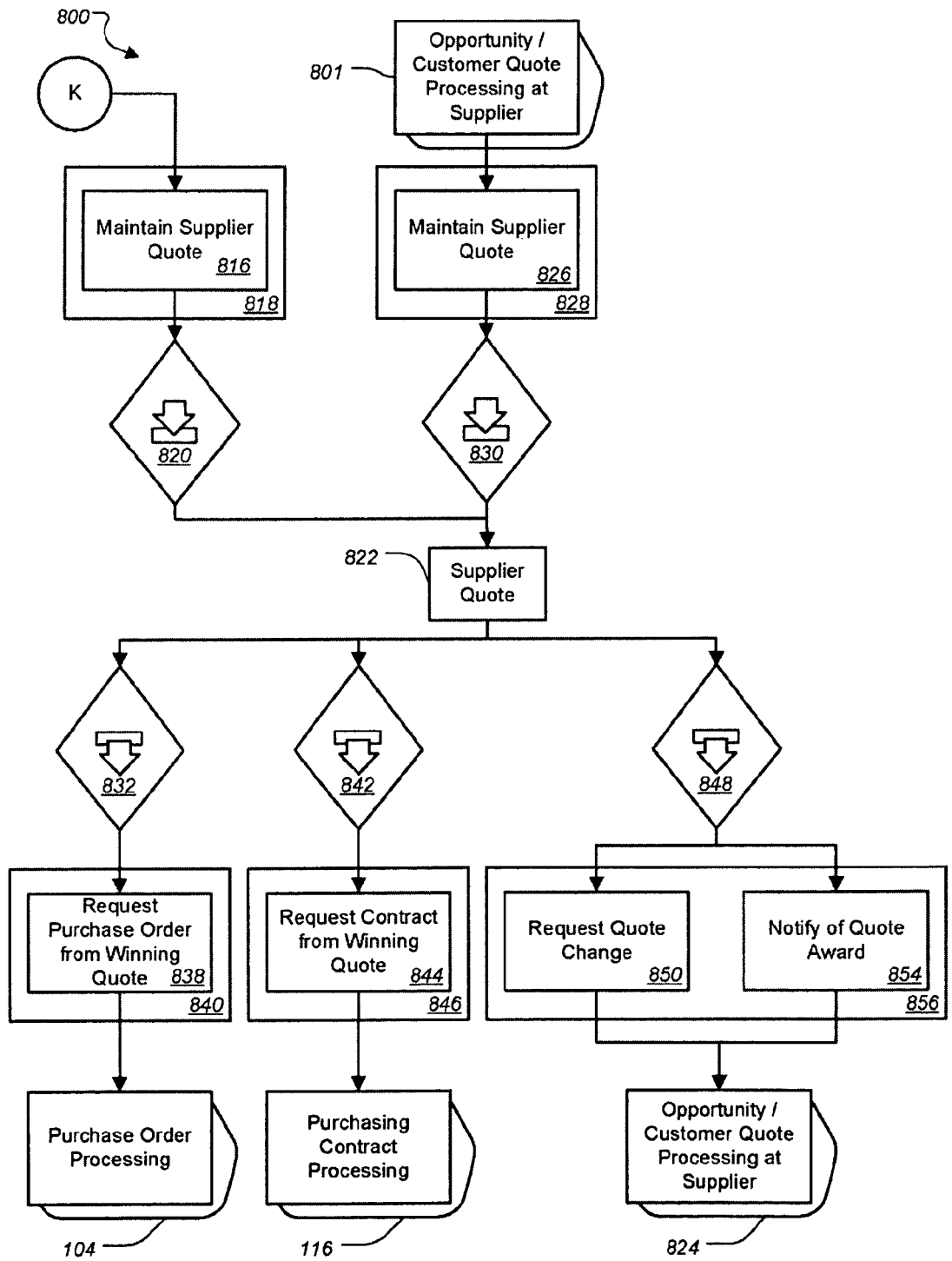
Figure 8C:
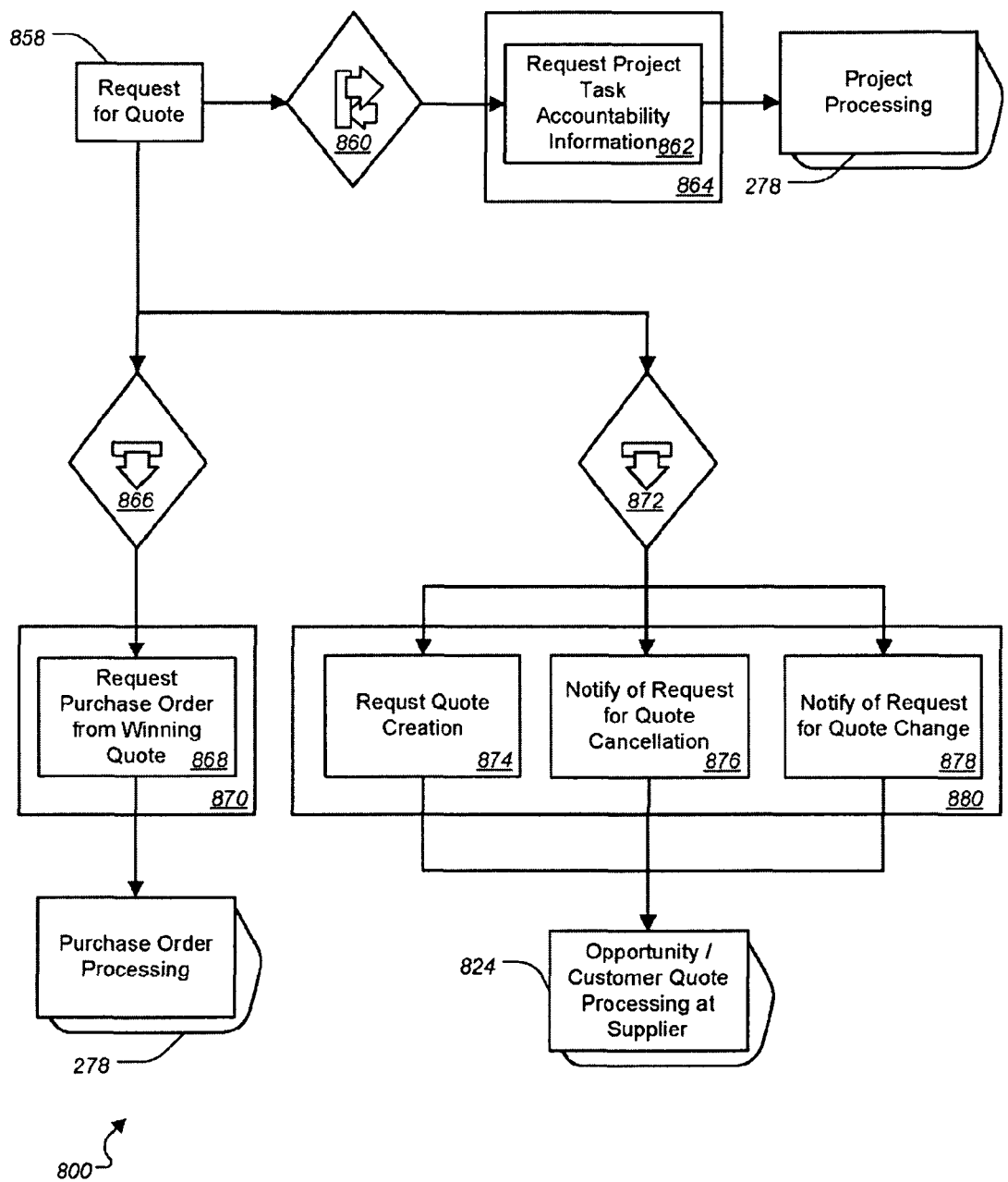

FIGS. 8A, 8B, and 8C are block diagrams collectively showing an RFQ Processing process component. For convenience in describing this process component, a number of other process components are shown in the figures; these other process components are not part of the process component being described. These other process components include the Purchase Order Processing process component 104, the Purchase Request Processing process component 110, the Purchase Contract Processing process component 116, Project Processing process component 278 and an Opportunity/Customer Quote Processing at Supplier process component 801. These other process components are used to represent software external to the process component in describing its interactions with the external software; however, while the external software can be implemented as such process components, this is not required.

The Purchase Request Processing process component 110 can send a message to the RFQ Processing process component 800. The message can be received in a Maintain RFQ Request operation 802 or a Cancel RFQ Request operation 804. The Maintain RFQ Request operation 802 creates an RFQ request from business documents that are involved in the bidding process or in the negotiation process. The Cancel RFQ Request operation 804 can cancel an RFQ request and cancels the corresponding bidding process (this is, the operation cancels the corresponding request for quote if one has been initiated). The operations 802, 804 are included in a Request for Quote In interface 806. The operations 802, 804 can use an asynchronous inbound process agent 808 to update the RFQ Request business object 810. The RFQ Request business object 810 represents a request to the purchasing department to prepare a request for quote.

The RFQ Request business object 810 uses an asynchronous outbound process agent 811 to invoke a Confirm RFQ Request operation 812. The operation 812 confirms execution of the request for quote. The operation 812 is included in a Request for Quote Out interface 814. The Confirm RFQ Request operation 812 can send an update to the Purchase Request Processing process component 110 and the Purchasing Contract Processing process component 116.

The Purchasing Contract Processing process component 116 (FIG. 8A) can also be received in a Change Supplier Quote based on Purchasing Contract operation 816 (FIG. 8B). The operation 816 can change a supplier quote based on the purchasing contract confirmation. The operation 816 is included in a Purchasing Contract In interface 818. The Change Supplier Quote based on Purchasing Contract operation 816 can use an asynchronous inbound process agent 820 to update the Supplier Quote business object 822. The Supplier Quote business object 822 represents a response to a request for quote in which a bidder offers to sell goods and services to a buyer according to the request criteria.

As shown in FIG. 8B, the Opportunity/Customer Quote Processing at Supplier process component 824 can send a message to the RFQ Processing process component 800. The message can be received in a Maintain Supplier Quote operation 826. The operation 826 creates or updates a supplier quote on the basis of the received customer quote which was sent in response to the invitation from the buyer to submit a quotation. The operation 826 is included in a Quote Processing In interface 828. The Maintain Supplier Quote operation 826 can use an asynchronous inbound process agent 830 to update the Supplier Quote business object 822.

The Supplier Quote business object 822 can use an asynchronous outbound process agent 832 to invoke a Request Purchase Order from Winning Quote operation 838. The operation 838 can request a purchase order based on the awarded respective winning supplier quote. The operation 838 is included in a Quote Award Notification Out interface 840. The Request Purchase Order from Winning Quote operation 838 can send an update message to the Purchase Order Processing process component 104.

The Supplier Quote business object 136 can use a Request Purchasing Contract from Supplier Quote to Purchasing Contract Processing asynchronous outbound process agent 842 to invoke a Request Contract from Winning Quote operation 844. The operation 844 creates or updates a purchasing contract based on an accepted supplier quote. The Request Contract from Winning Quote operation 844 is included in a Purchasing Contract Out interface 846. The operation 844 can send an update message to the Purchasing Contract Processing process component 114.

The Supplier Quote business object 822 can use an asynchronous outbound process agent 848 to invoke a Request Quote Change operation 850. The operation 850 can request the change of the customer quote. The Supplier Quote business object 822 can also use the asynchronous outbound process agent 848 to invoke a Notify of Quote Award operation 854. The operation 854 can notify the bidder either about supplier quote items for which the quotation from the bidder has been awarded, including extending the award or about a rejection if the quotation from the bidder is not successful. The operations 850, 854 are included in a Quote Processing Out interface 856. The operations 850, 854 can send an update message to the Opportunity/Customer Quote Processing at Supplier process component 824.

As shown in FIG. 8C, the Request for Quote business object 858 uses a synchronous outbound process agent 860 to invoke a Request Project Task Accountability Information operation 862. The operation 862 can check the project task accountability. The Request Project Task Accountability Information operation 862 is included in a Project Task Accountability Out interface 864. The operation 862 can send messages to the Project Processing process component 278.

The Request for Quote business object 858 can also use an asynchronous outbound process agent 866 to invoke a Notify of Project Task Assignment operation 868. The operation 868 can notify of a request for quote project task assignment. The Notify of Project Task Assignment operation 868 is included in a Project Task Assignment Notification Out interface 870. The operation 868 can send messages to the Project Processing process component 278.

Furthermore, the Request for Quote Business object 858 can also use an asynchronous outbound process agent 872 to invoke a Request Quote Creation operation 874, a Notify of Request for Quote Cancellation operation 876, or a Notify of Request for Quote Change operation 878. The Request Quote Creation operation 874 can request the participation of the supplier in a bidding process. The Notify of Request for Quote Cancellation operation 876 can notify the supplier about the cancellation of a request for quote. The Notify of Request for Quote Change operation 878 can notify the supplier about changes to a request for quote. The operations 874, 876, and 878 are included in a Request Quote Processing Out interface 880. The operations 874, 876, and 878 can be used to send an update to the Opportunity/Customer Quote Processing at Supplier process component 824.

Figure 9:
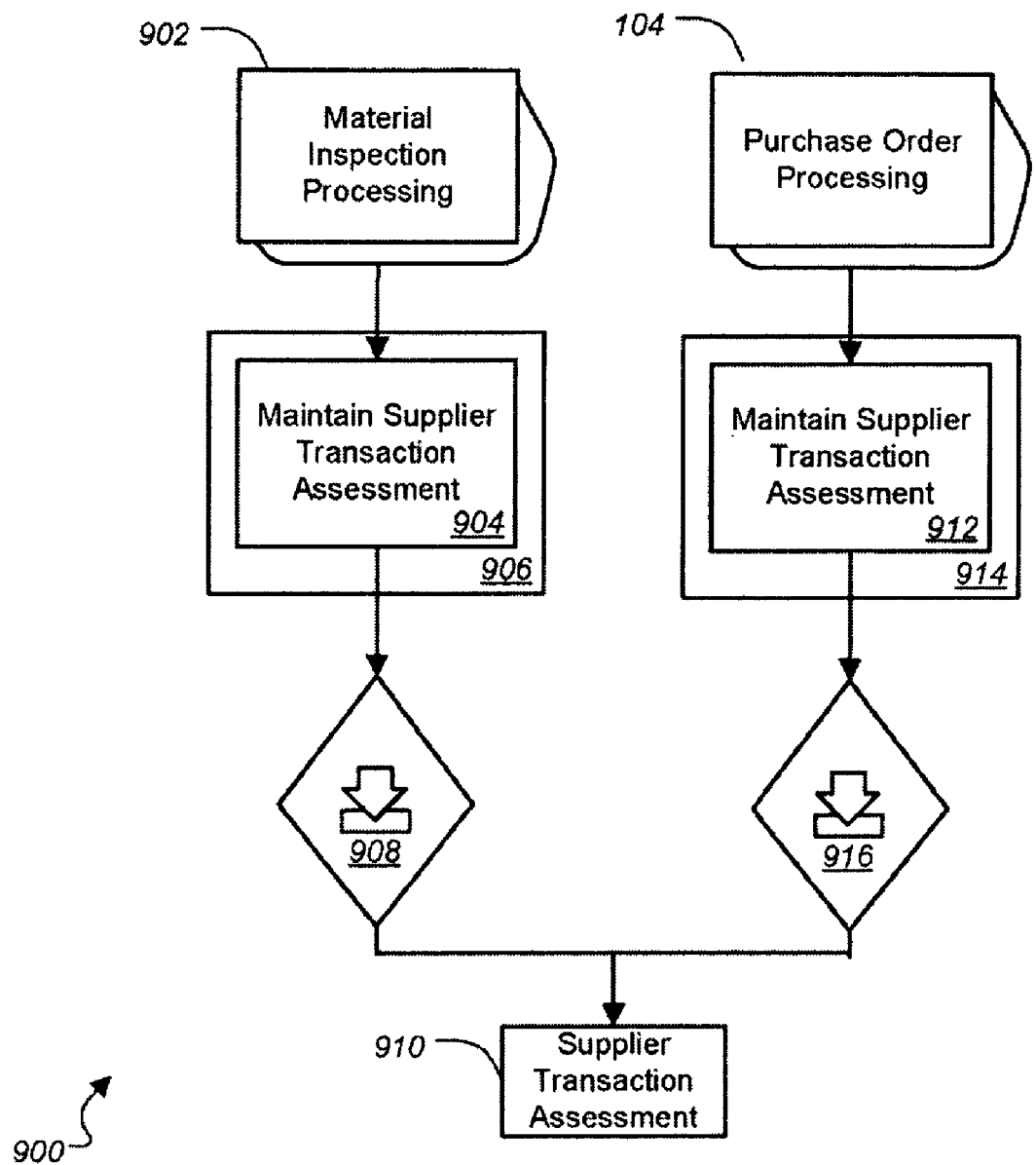
FIG. 9 is a block diagram showing a Supplier Performance Assessment process component.

As shown in FIG. 9, a Material Inspection process component 902 can send a message to a Supplier Performance Assessment process component 900. The message can be received in a Maintain Supplier Transaction Assessment operation 904. The operation 904 can use an asynchronous inbound process agent 908 to update a Supplier Transaction Assessment business object 910. The Supplier Transaction Assessment business object 910 represents the assessment of a supplier's performance based on business transactions that are evaluated automatically. The Maintain Supplier Transaction Assessment operation 904 is included in a Material Inspection Notification In interface 906.

The Purchase Order Processing process component 104 can send a message to a Supplier Performance Assessment process component 900. The message can be received in a Maintain Supplier Transaction Assessment operation 912. The operation 912 can use an asynchronous inbound process agent 916 to update the Supplier Transaction Assessment business object 910. The Maintain Supplier Transaction Assessment operation 912 is included in a Ordering Notification In interface 914.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the invention or of what may be claimed, but rather as illustrating preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable medium including program code for providing message-based services using a service-oriented methodology for implementing an instance of a deployment unit, the medium comprising:

program code for storing an instance of a purchasing deployment unit for the integrated management of the operational purchasing life cycle, covering activities to control and centrally manage purchase requests, manage contracts, perform purchase order collaboration, and confirm goods and services, where the purchasing deployment unit defines the limits of an application-defined transaction for the integrated management of the operational purchasing life cycle, covering activities to control and centrally manage purchase requests, manage contracts, perform purchase order collaboration, and confirm goods and services by a set of actions that have atomicity, consistency, isolation, and durability in a database, and wherein the actions associated with the application-defined transaction are performed by one or more process components contained in the purchasing deployment unit, wherein each process component comprises a software package realizing a business process and exposing its functionality as one or more service operations, wherein the purchasing deployment unit comprises:

a purchase order processing process component, wherein the purchase order processing process component implements the following service operations:

a request purchase order cancellation operation, a change purchase order based on invoice values operation, a create purchase order confirmation operation, a change purchase order based on inbound delivery request operation, a notify of invoicing due operation, a change purchase order based on delivery values operation, a create purchase order based on winning quote operation, a notify of purchase order operation, a request purchase order change operation, a notify of expected delivery operation, a notify of purchase order operation, a request purchase order creation operation, a notify of purchase order operation, a create purchase order operation, and a request supplier invoice request migration operation;

a purchase request processing process component, wherein the purchase request processing process component implements the following service operations:

a change purchase request based on RFQ execution operation, a request RFQ execution operation, a confirm purchase request operation, a notify of purchase request operation, and a maintain purchase request operation;

a purchasing contract processing process component, wherein the purchasing contract processing process component implements the following service operations:

a change purchasing contract based on RFQ execution operation, a confirm purchasing contract operation, a maintain purchasing contract operation, a notify of product catalog operation, a notify of project task assignment operation, a notify of purchasing contract operation, a request project task accountability information operation, a request RFQ execution cancellation operation, a request RFQ execution operation, a maintain purchasing contract release operation, a create purchasing contract operation, a notify of invoicing due operation, and a notify of purchase schedule agreement operation;

a goods and service acknowledgement process component, wherein the goods and service acknowledgement process component implements the following service operations:

a create goods and service acknowledgement operation, a create goods and service acknowledgement operation, a confirm goods and service acknowledgement operation, a notify of invoicing due operation, a notify of goods and service acknowledgement operation, a notify of goods and service acknowledgement operation, a notify of goods and service acknowledgement cancellation operation, and a cancel goods and service acknowledgement operation; and wherein the process components of the purchasing deployment unit are packaged together to be deployed on a single computer system; and program code for executing the application-defined transaction for integrating management of the operational purchasing life cycle, covering activities to control and centrally manage purchase requests, manage contracts, perform purchase order collaboration, and confirm goods and services; and program code for presenting data associated with the executed application-defined transaction for integrating management of the operational purchasing life cycle, covering activities to control and centrally manage purchase requests, manage contracts, perform purchase order collaboration, and confirm goods and services to a graphical user interface.

2. The non-transitory computer readable medium of claim 1, wherein the purchase order processing process component comprises a purchase order business object and a purchase order confirmation business object.

3. The non-transitory computer readable medium of claim 1, wherein the purchase request processing process component comprises a purchase order creation run business object and a purchase request business object.

4. The non-transitory computer readable medium of claim 1, wherein the purchasing contract processing process component comprises a purchasing contract business object.

5. The non-transitory computer readable medium of claim 1, wherein the goods and service acknowledgement process component comprises a goods and service acknowledgement business object.

6. The non-transitory computer readable medium of claim 1, wherein the services operations associated with the purchase order processing process component are grouped into service interfaces, the service interfaces comprising:
an ordering out interface that includes the request purchase order cancellation operation, the request purchase order creation operation, and the request purchase order change operation;
an invoice verification in interface that includes the change purchase order based on invoice values operation; an ordering in interface that includes the create purchase order confirmation operation; a purchase order inbound delivery in interface that includes the change purchase order based on inbound delivery request operation;
an invoice verification out interface that includes the notify of invoicing due operation; a fulfillment in interface that includes change purchase order based on delivery values operation;
a quote award notification in interface that includes create purchase order based on winning quote operation; an ordering notification out interface that includes the notify of purchase order operation; a purchase order inbound delivery out interface that includes the notify of expected delivery operation;
an employee time confirmation view of service transaction document management out interface that includes the notify of purchase order operation;
a sales and purchasing accounting out interface that includes the notify of purchase order operation; a migration in interface that includes the create purchase order operation; and a supplier invoice request migration out interface that includes the request supplier invoice request migration operation.

7. The non-transitory computer readable of claim 1, wherein the services operations associated with the purchase request processing process component are grouped into service interfaces, the service interfaces comprising:
a request for quote in interface that includes the change purchase request based on RFQ execution operation;
a request for quote out interface that includes the request RFQ execution operation; a purchasing out interface that includes the confirm purchase request operation;
a purchasing notification out interface that includes the notify of purchase request operation; and
a purchasing in interface that includes the maintain purchase request operation.

8. The non-transitory computer readable of claim 1, wherein the services operations associated with the purchasing contract processing process component are grouped into service interfaces, the service interfaces comprising:
a request for quote in interface that includes the change purchasing contract based on RFQ execution operation;
a purchasing contract out interface that includes the confirm purchasing contract operation;
a purchasing contract in interface that includes the maintain purchasing contract operation;
a product catalogue authoring out interface that includes the notify of product catalog operation;
a project task assignment notification out interface that includes the notify of project task assignment operation;
a contracting notification out interface that includes the notify of purchasing contract operation;
a project task accountability out interface that includes the request project task accountability information operation;
a request for quote out interface that includes the request RFQ execution cancellation operation;
a request for quote out interface that includes the request RFQ execution operation;
a contract release in interface that includes the maintain purchasing contract release operation;
a migration in interface that includes the create purchasing contract operation;
an invoice verification out interface that includes the notify of invoicing due operation; and
a purchase schedule agreement replication out interface that includes the notify of purchase schedule agreement operation.

9. The non-transitory computer readable of claim 1, wherein the services operations associated with the goods and service acknowledgement process component are grouped into service interfaces, the service interfaces comprising:
an acknowledgement in interface that includes the create goods and service acknowledgement operation;
an internal acknowledgement in interface that includes the create goods and service acknowledgement operation;
an acknowledgement out interface that includes the confirm goods and service acknowledgement operation;
an invoice verification out interface that includes the notify of invoicing due operation;
a customer project expenses notification out interface that includes the notify of goods and service acknowledgement operation;
a goods and service accounting out interface that includes the notify of goods and service acknowledgement operation;
a goods and service accounting out interface that includes the notify of goods and service acknowledgement cancellation operation; and
an internal acknowledgement in interface that includes the cancel goods and service acknowledgement operation.

10. The non-transitory computer readable medium of claim 1, wherein the single computer system comprises a single physical hardware platform.

* * * * *